United States Patent
Sakuma et al.

(10) Patent No.: US 9,134,920 B2
(45) Date of Patent: Sep. 15, 2015

(54) STORAGE APPARATUS AND COMMAND CONTROL METHOD

(71) Applicant: Hitachi, Ltd., Tokyo (JP)

(72) Inventors: Yuki Sakuma, Tokyo (JP); Kazuya Yokoyama, Tokyo (JP); Koji Akiyama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/349,588

(22) PCT Filed: Jul. 17, 2013

(86) PCT No.: PCT/JP2013/069432
§ 371 (c)(1),
(2) Date: Apr. 3, 2014

(87) PCT Pub. No.: WO2015/008352
PCT Pub. Date: Jan. 22, 2015

(65) Prior Publication Data
US 2015/0113217 A1    Apr. 23, 2015

(51) Int. Cl.
| | |
|---|---|
| G06F 12/00 | (2006.01) |
| G06F 13/00 | (2006.01) |
| G06F 13/28 | (2006.01) |
| G06F 3/06 | (2006.01) |
| G06F 13/10 | (2006.01) |
| G06F 15/167 | (2006.01) |

(52) U.S. Cl.
CPC .............. *G06F 3/0659* (2013.01); *G06F 3/06* (2013.01); *G06F 3/061* (2013.01); *G06F 3/0665* (2013.01); *G06F 3/0689* (2013.01); *G06F 13/10* (2013.01); *G06F 15/167* (2013.01)

(58) Field of Classification Search
CPC ... G06F 3/0659; G06F 3/0689; G06F 3/0665; G06F 3/061; G06F 15/167; G06F 3/06; G06F 13/10
See application file for complete search history.

(56) References Cited

U.S. PATENT DOCUMENTS

| | | | |
|---|---|---|---|
| 5,592,648 A * | 1/1997 | Schultz et al. | ................ 711/114 |
| 2005/0120173 A1 | 6/2005 | Minowa | |
| 2009/0228663 A1 | 9/2009 | Ichino | |

FOREIGN PATENT DOCUMENTS

| | | |
|---|---|---|
| JP | 2005-157830 A | 6/2005 |
| JP | 2009-238197 A | 10/2009 |
| WO | 2012/046278 A1 | 4/2012 |

* cited by examiner

*Primary Examiner* — Cheng-Yuan Tseng
*Assistant Examiner* — Rocio Del Mar Perez-Velez
(74) *Attorney, Agent, or Firm* — Mattingly & Malur, PC

(57) ABSTRACT

A storage apparatus which contains a plurality of microprocessors includes a virtual queue which stores a virtual command which is used in the storage apparatus; a real queue which stores a real command based on an actual communication protocol; a first pointer which is updated when the virtual command is stored in the virtual queue; a second pointer which is updated when the first pointer is updated; a checking unit which detects an update to the first pointer and updates the second pointer; and a controller. Upon detecting that the second pointer has been updated by the checking unit, the controller references the second pointer and the first pointer, and, after reading the virtual command stored in the virtual queue and converting the virtual command to the real command, stores the real command in the real queue.

15 Claims, 16 Drawing Sheets

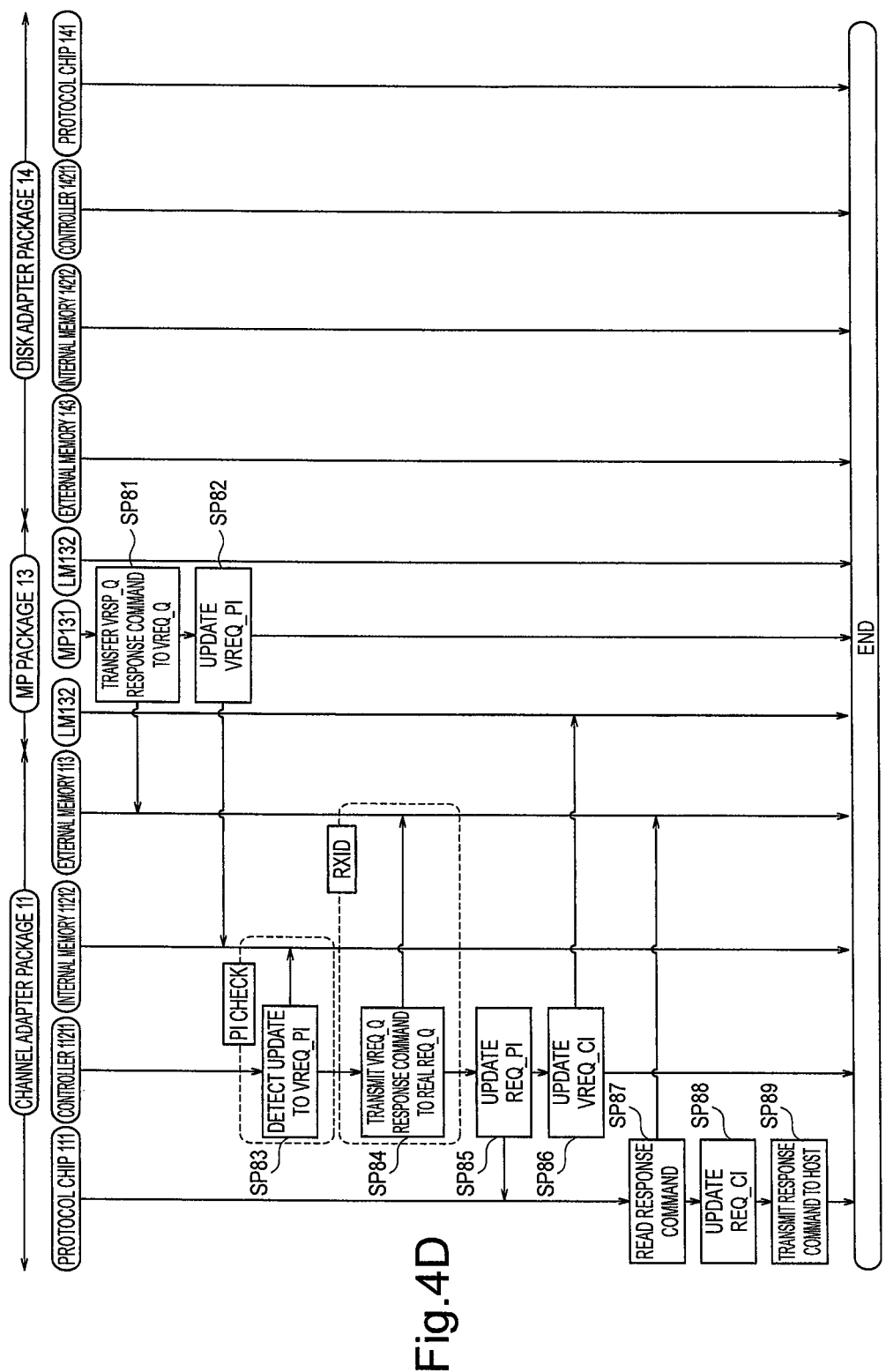

| RX_ID NUMBER | DATA | | | | | | | |
|---|---|---|---|---|---|---|---|---|
| | 7 | 6 | 5 | 4 | 3 | 2 | 1 | 0 |
| 0x000 | val | MP NUMBER IN USE | | | | | | |
| 0x001 | val | MP NUMBER IN USE | | | | | | |
| 0x002 | val | MP NUMBER IN USE | | | | | | |
| ⋮ | ⋮ | | | | | | | |
| 0xFFF | val | MP NUMBER IN USE | | | | | | |

112141

STORAGE APPARATUS AND COMMAND CONTROL METHOD

TECHNICAL FIELD

The present invention relates to a storage apparatus and a command control method.

BACKGROUND ART

In recent years, technology for realizing a high-performance storage apparatus by incorporating a plurality of microprocessors in the storage apparatus has been investigated. For example, PTL 1 discloses a storage apparatus which comprises a channel adapter package and a microprocessor package, and in which a plurality of microprocessors are incorporated in the microprocessor package.

In the storage apparatus according to PTL 1, a communication conversion circuit is disposed between a protocol chip, which is provided in a channel adapter package, and a microprocessor, which is provided in a microprocessor package, and since the communication conversion circuit is made to handle differences between different procedures of each communication protocol, there is no need to provide a dedicated microprocessor for each type of communication protocol, thereby reducing microprocessor development and production costs.

CITATION LIST

Patent Literature

[PTL 1]
International Publication No. 2012/046278

SUMMARY OF INVENTION

Technical Problem

However, with the technology disclosed in PTL 1, there is no mention of the bottleneck which occurs when a plurality of microprocessors are installed. For example, PTL 1 discloses a storage apparatus which contains a total of 32 microprocessors but investigations are underway on increasing the number of microprocessors installed in the future and installing, for example, a total of 128 microprocessors. Thought has been given to the bottleneck which is produced when increasing the number of installed microprocessors, as detailed below, for example.

Respective virtual queues are associated with a plurality of microprocessors and microprocessors store response commands, for example, in the virtual queues associated with those same microprocessors. Note that these virtual queues are queues which are provided in the communication conversion circuit. If a response command is stored in a virtual queue, the communication conversion circuit transfers the response command to the protocol chip, accessing, at regular intervals, the virtual queue in order to determine whether or not a response command has been stored in the virtual queue. This regular access is called polling and polling is performed sequentially for each of the virtual queues associated with the microprocessors. Accordingly, when the number of installed microprocessors increases, the number of pollings also proportionately increases. For example, in the case of the storage apparatus disclosed in PTL 1, since a total of 32 microprocessors are installed, the number of pollings is also 32 for a single pass. Among the 32 pollings, it may be determined as a result of the first polling that the virtual queue stores a response command, but if, for example, it is finally determined in the thirty-second polling that the virtual queue stores a response command, processing has then been delayed by thirty-one pollings. In other words, the greater the number of microprocessors installed, the greater the number of pollings, and the greater the increase in unnecessary access to virtual queues, and hence the processing speed is reduced.

Furthermore, when the protocol chip transfers a read command, for example, to a virtual queue which is associated with each microprocessor and stores the read command in the virtual queue, the protocol chip transfers the read command after issuing a transfer ID and appending this transfer ID to the read command as identification information for the microprocessor which actually executes the command processing. Note that, the virtual queue here is a queue that is provided in a microprocessor package. The ID is called an RX_ID (Responder XID), but the number of IDs which can be used as an RX_ID is finite. Accordingly, when usable RX_IDs are uniformly assigned to each of the plurality of microprocessors in the storage apparatus containing a plurality of microprocessors, the number of usable RX_IDs assigned to a single microprocessor is reduced. As the number of microprocessors installed increases, the number of usable RX_IDs assigned to a single microprocessor is greatly reduced. In this case, when the command processing is focused on a single microprocessor, the single microprocessor must execute command processing by using a small number of RX_IDs, and the number of usable RX_IDs is depleted, meaning that it is then necessary to wait for RX_IDs to be issued. Accordingly, the processing speed is reduced as a result of the wait for RX_IDs to be issued.

Furthermore, hard disks which are destinations for issued commands are associated with each of a plurality of microprocessors, and when a microprocessor actually executes command processing, the microprocessor issues a command to any associated hard disk. In a storage apparatus which contains a plurality of microprocessors, in a case where a plurality of microprocessors execute command processing simultaneously and where the plurality of microprocessors each issue a command to the same hard disk, access then comes to be focused on a single hard disk. In this case, a processing backlog ensues for the single hard disk, thereby reducing the processing speed.

The present invention was conceived in view of the above problems and proposes a storage apparatus and a command control method with which an improvement in the processing speed of a storage apparatus containing a plurality of microprocessors can be realized.

Solution to Problem

In order to solve this problem, a storage apparatus according to the present invention is a storage apparatus which contains a plurality of microprocessors, comprising a virtual queue which stores a virtual command which is used in the storage apparatus; a real queue which stores a real command based on a communication protocol; a first pointer which is updated when the virtual command is stored in the virtual queue; a second pointer which is updated when the first pointer is updated; a checking unit which detects an update to the first pointer and updates the second pointer; and a controller, wherein, upon detecting that the second pointer has been updated by the checking unit, the controller references the second pointer and the first pointer, and after reading the virtual command stored in the virtual queue and converting the virtual command to the real command, stores the real command in the real queue.

Furthermore, in order to solve this problem, a command control method according to the present invention is a command control method of a storage apparatus which contains a plurality of microprocessors, comprising a first step in which the microprocessor stores a virtual command, which is used in the storage apparatus, in a virtual queue; a second step in which the microprocessor updates a first pointer when the virtual command is stored in the virtual queue; a third step in which a checking unit detects an update to the first pointer and updates the second pointer; a fourth step in which, upon detecting that the second pointer has been updated by the checking unit, a controller references the second pointer and the first pointer, reads the virtual command stored in the virtual queue, and converts the virtual command to a real command; and a fifth step in which the controller stores the real command in the real queue.

Advantageous Effects of Invention

With the present invention, an improvement in the processing speed of a storage apparatus which contains a plurality of microprocessors can be realized.

BRIEF DESCRIPTION OF DRAWINGS

FIG. 4D is a flowchart showing the flow of command processing according to this embodiment.

DESCRIPTION OF EMBODIMENTS

An embodiment of the present invention will be described in detail hereinbelow with reference to the drawings.

(1) Overall Configuration

Figure 1:
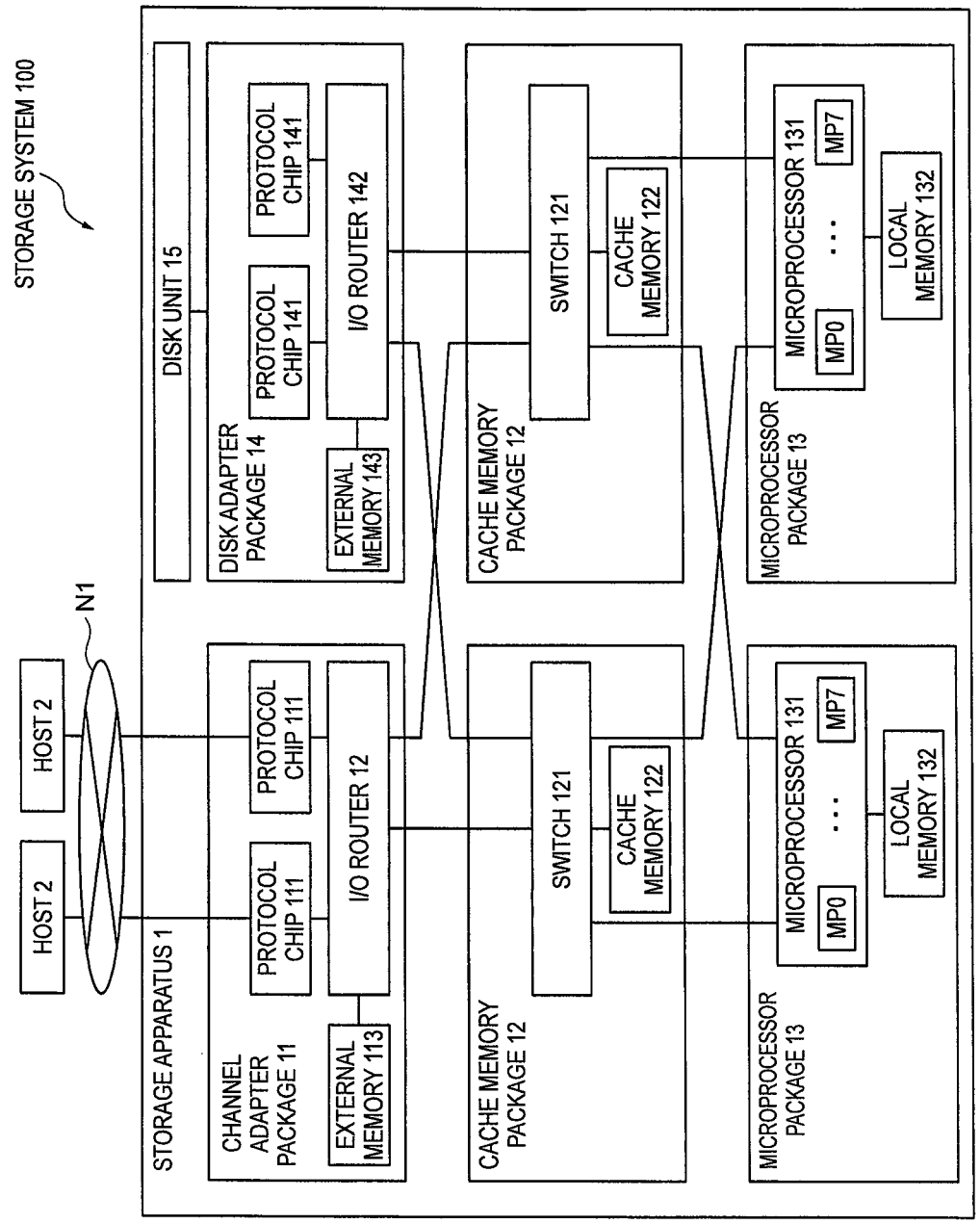
FIG. 1 is an overall constitutional view of a storage system.

FIG. 1 shows an overall constitution of a storage system 100 according to this embodiment. The storage system 100 is configured from a storage apparatus 1 and a host 2. The storage apparatus 1 and the host 2 are connected communicably by a communication network N1 such as an IP-SAN (Internet Protocol SAN) or an FC-SAN (Fibre Channel SAN), for example.

The storage apparatus 1 is configured from a channel adapter package 11, a cache memory package 12, a microprocessor package 13, a disk adapter package 14, and a disk unit 15. Note that there are no particular limitations on the numbers of components 11 to 15 which are installed, for example a plurality of the channel adapter package 11 and of the disk adapter package 14 may be installed.

The channel adapter package 11 is a control circuit for controlling communications between a host 2 and a microprocessor package 13, and is configured from a protocol chip 111, an I/O (input/output) router 112 and an external memory 113.

The protocol chip 111 is a control circuit for controlling communications with a host 2 on the basis of various communication protocols such as the FC (Fibre Channel) protocol or the FCoE (Fibre Channel over Ethernet (registered trademark) protocol, for example. The protocol chip 111 executes the assembly and disassembly of FC frames or FCoE frames.

The I/O router 112 is a control circuit which is disposed between the protocol chip 111 and the microprocessor package 13 and which is for controlling communications between the protocol chip 111 and the microprocessor package 13. The external memory 113 is a memory which is disposed separately from the I/O router 112 and which is connected to the I/O router 112.

The cache memory package 12 is a control circuit for connections to the channel adapter package 11, the microprocessor package 13, and the disk adapter package 14 respectively, and which is configured from a switch 121 and a cache memory 122.

The switch 121 is a switch for switching the connections between each of the packages 11, 13, and 14. The cache memory 122 is a memory for temporarily storing various data and various commands from each of the connected packages 11, 13, and 14.

The microprocessor package 13 is a control circuit for executing processing of various commands and is configured comprising a microprocessor 131 and a local memory 132. The microprocessor 131 is configured from a plurality of microprocessors (MP) and executes the processing of commands from the host 2 by means of interaction with various programs which are stored in the local memory 132.

The disk adapter package 14 is a control circuit for controlling communications between the microprocessor package 13 and the disk unit 15 and is configured from a protocol chip 141, an I/O router 142, and an external memory 143.

The protocol chip 141 is a control circuit for controlling communications with the disk unit 15 on the basis of various communication protocols such as the FC protocol or the FCoE protocol. The I/O router 142 is a control circuit which is disposed between the protocol chip 141 and the microprocessor package 13 and which is for controlling communications between the protocol chip 141 and the microprocessor package 13. The external memory 143 is a memory which is disposed separately from the I/O router 142 and which is connected to the I/O router 142.

The disk unit 15 is a storage device which is configured from a plurality of hard disks, for example, and which stores read data and write data for long periods.

The host 2 is an open server computer and is configured comprising a communication interface circuit for communicating with the storage apparatus 1 on the basis of various communication protocols such as the FC protocol or the FCoE protocol.

Further, the host 2 transmits various commands such as read commands or write commands to the storage apparatus 1 in order to request the inputting and outputting of data in block units. For example, a read command from the host 2 is ultimately transmitted to the disk unit 15 via the channel adapter package 11, the cache memory package 12, the microprocessor package 13, and the disk adapter package 14.

(2) Internal Configuration

Figure 2:
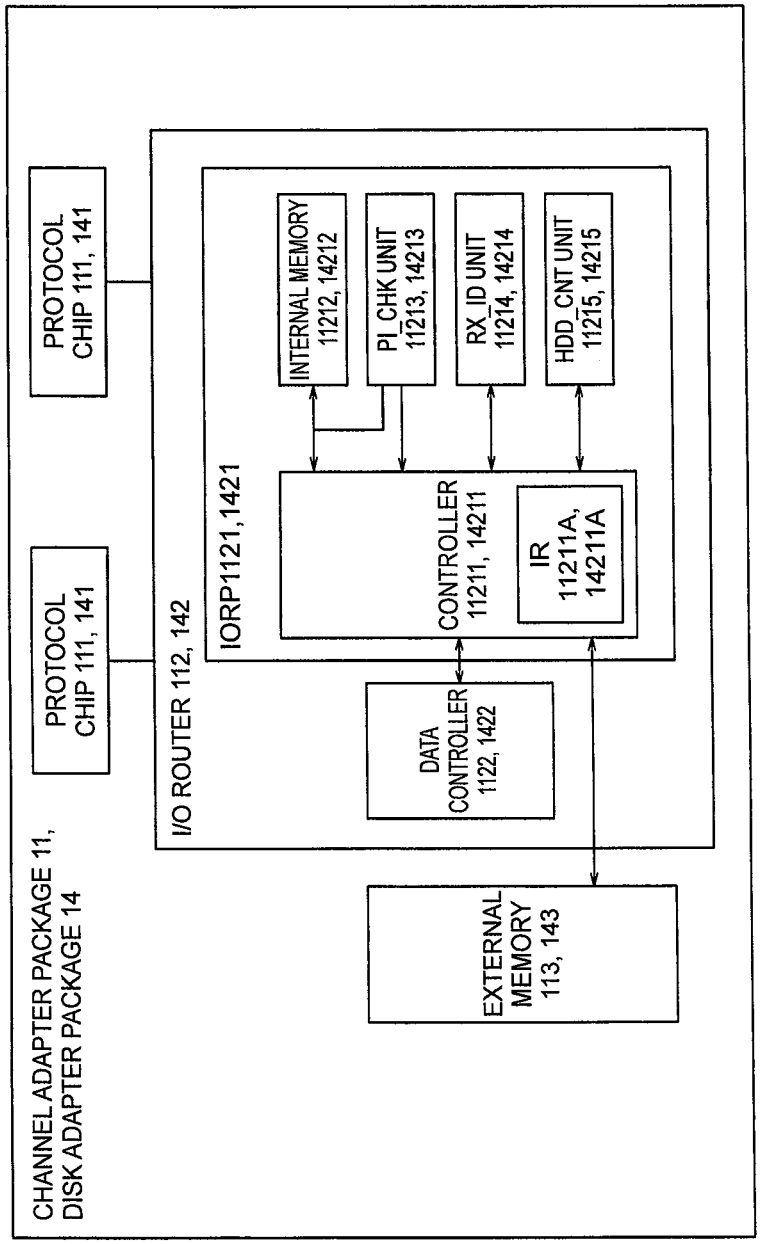
FIG. 2 is an internal constitutional view of a channel adapter.

FIG. 2 shows the internal configuration of a channel adapter package 11 and a disk adapter package 14. The channel adapter package 11 is configured comprising the protocol chip 111, the I/O router 112, and the external memory 113 as illustrated in FIG. 1, the I/O router 112 being configured from an IORP (I/O router processor) 1121 and a data controller 1122 as shown in FIG. 2.

The IORP 1121 is a processor for executing command transfer processing between the protocol chip 111 and the microprocessor 131. Further, here, the data controller 1122 is a control circuit which receives commands from the protocol chip 111 via an interface (not shown) and transmits the commands to the IORP 1121, and which transfers the commands from the IORP 1121 to the microprocessor 131.

Further, the IORP 1121 is configured from a controller 11211, an internal memory 11212, a PI_CHK unit 11213, an RX_ID unit 11214, and an HDD_CNT unit 11215.

The controller 11211 is a control circuit for centrally controlling the operation of the IORP 1121. Furthermore, the controller 11211 is configured comprising an IR (Index Register) 11211A. The IR 11211A is a register which is updated by the PI_CHK unit 11213 when there is access to the internal memory 11212 from the microprocessor 131.

The internal memory 11212 is a memory which is configured comprising a register which indicates whether or not real queue and command transfer processing for storing commands from the protocol chip 111 is complete.

The PI_CHK unit 11213 is a control circuit for monitoring access to the internal memory 11212 and is updated, in a case where access has been made from the microprocessor 131 to the internal memory 11212, by writing the address in the accessed internal memory 11212 to the IR 11211A. Further, the PI_CHK unit 11213 is updated, in a case where the controller 11211 accesses the address in the internal memory 11212 written to the IR 11211A, by writing the address in the accessed internal memory 11213 or another internal memory 11212.

In other words, the PI_CHK unit 11213 is able to notify the controller 11211 via the IR 11211A regarding the access to the internal memory 11212. Thus, conventionally, the controller 11211 has performed polling of the virtual queues associated with the microprocessors a number of times equivalent to the number of microprocessors in the microprocessor 131, and yet is able to access the commands from the microprocessor simply by detecting an update of the IR 11211A without polling. Accordingly, the processing speed can be improved by reducing the load on the controller 11211.

The RX_ID unit 11214 is a control circuit which manages RX_IDs assigned to commands, and which, when the IORP 1121 transfers a command to the microprocessor 131, issues any assignable RX_ID which is currently unused among the usable RX_IDs and outputs this RX_ID to the controller 11211. The RX_ID which is output from the RX_ID unit 11214 is assigned to a command by the controller 11211 and the RX_ID-assigned command is transferred to the microprocessor 131.

In other words, the RX_ID unit 11214 is able to dynamically issue an RX_ID which is assigned to a command. Thus, conventionally, usable RX_IDs have been uniformly assigned to each of the microprocessors in the microprocessor 131, such that when processing is focused on a single microprocessor, there has been a risk of all the usable RX_ID assigned to one microprocessor being immediately put to use and depleted, whereas, according to this embodiment, the RX_IDs are not uniformly assigned, rather, resources are used affectively by managing the RX_IDs as RX_IDs which are available for shared usage by all microprocessors and dynamically assigning any RX_ID, whereby the depletion of the RX_IDs can be avoided. Thus, waiting for RX_IDs to be issued due to depletion of the RX_IDs can be prevented and the processing speed can be improved.

Here, the HDD_CNT unit 11215 is disposed in the IORP 1121 of the channel adapter package 11, but actually fulfills its function when disposed in the IORP 1421 of the disk adapter package 14. A HDD_CNT unit 14215 will be described hereinbelow when same is disposed in the IORP 1421 of the disk adapter package 14.

The HDD_CNT unit 14215 is a control circuit for managing, for each hard disk, the number of commands to be processed by the hard disks in the disk unit 15. In a case where a command is stored in the VREQ_Q in the external memory 143, the HDD_CNT unit 14125 increments by one the count of hard disks processing commands stored in the VREQ_Q, for example. Further, the HDD_CNT unit 14215 decrements by one the count of the hard disks after a hard disk has actually processed a command. The HDD_CNT unit 14125 then notifies the microprocessor 131 where necessary of the incremented or decremented count.

That is, the HDD_CNT unit 14125 monitors a load of the hard disks by managing the number of commands to be processed for each hard disk, and is able, when any hard disk has a high load, to notify the microprocessor 131 of the count. Thus, conventionally, when processing has been focused on a single hard disk, a processing backlog for that hard disk has been produced, whereas, according to the present embodiment, it is possible to monitor hard disk loads and issue notification to the microprocessor 131 so that commands are not issued to a hard disk with a high load. Accordingly, a processing backlog for that hard disk can be avoided and the processing speed can be improved.

(3) Command Flow

Figure 3:
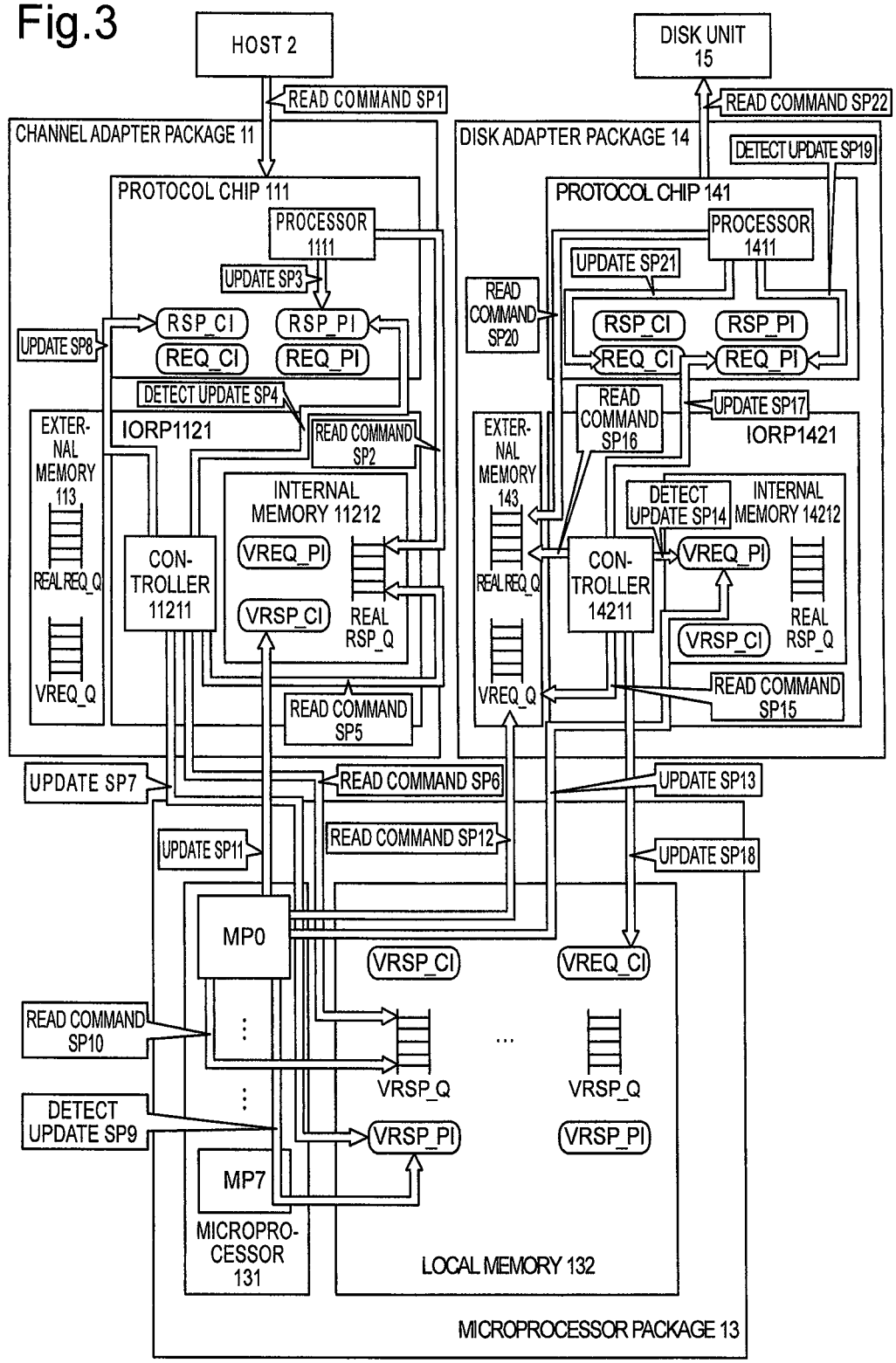
FIG. 3 is a conceptual view showing the typical flow of command processing.

FIG. 3 shows a typical command flow. Here, the flow of commands in a case where a command is a read command will be described.

First, when the host 2 transmits a read command to the protocol chip 111, the protocol chip 111 receives this command (SP1). The processor 1111 in the protocol chip 111 then transmits the received read command to the I/O router 112. Upon receiving the read command from the processor 1111, the I/O router 112 stores the read command in the real RSP_Q (ReSPonse_Queue) in the internal memory 11212 (SP2).

The real RSP_Q is a real queue for storing commands which are issued from the host 2 on the basis of an actual communication protocol such as the FC protocol or the FCoE protocol.

After transferring the read command to the real RSP_Q in step SP2, the processor 1111 updates the RSP_PI (ReSPonse_Producer Index) (SP3).

The RSP_PI is a pointer which is provided in a register in the protocol chip 111. The RSP_PI manages real RSP_Q updates, and when the real RSP_Q is updated, stores the updated real RSP_Q address.

The controller 11211 in the IORP 1121 monitors (polls) the RSP_PI at regular intervals, and when it is detected that the RSP_PI has been updated (SP4), determines that a command which is to be transferred to the microprocessor package 13 is stored in the real RSP_Q.

The controller 11211 subsequently reads the read command from the real RSP_Q (SP5) and, after converting the read command thus read to a virtual read command, stores the converted read command in a VRSP_Q (Virtual ReSPonse_Queue) in the local memory 13 (SP6).

The VRSP_Q is a virtual queue for storing virtual commands which are issued from the IORP 1121.

Note that communications between the IORP 1121 and the microprocessor 131 are carried out by using the virtual queue. When communications are carried out by using the virtual queue, there are the following advantages.

That is, when the IORP 1121 transfers a command which is stored in the real queue (real RSP_Q) to the virtual queue (VRSP_Q) and stores the command in the virtual queue, the command stored in the real queue is converted into a virtual command which is used only internally and the converted command is transferred to the virtual queue. The microprocessor 131 may execute command processing on the virtual command which is used only internally, and it is thus possible to execute shared command processing irrespective of the type of communication protocol.

In addition, as a result of the IORP 1121 performing processing to allocate the commands stored in the real queue to any virtual queue (any microprocessor) and processing to aggregate commands stored in the virtual queue and store these commands in the real queue, it is possible to achieve load distribution of the microprocessor 131 and flexible handling of fault processing. For example, the IORP 1121 allocates fault processing commands which are time-consuming to the virtual queue associated with one microprocessor, while allocating normal I/O processing commands to the virtual queue associated with another microprocessor, thereby enabling load distribution and flexible fault handling of the microprocessor 131.

Furthermore, the microprocessor 131 is a shorter physical distance from the local memory 132 than the protocol chip 111. Accordingly, by providing a virtual queue to the local memory 132, when the microprocessor 131 executes command processing, access to the local memory 132 may be achieved, thereby enabling shortening of the access time.

Furthermore, thought has been given to cases where the number of compatible real queues is limited depending on the actual specifications of the protocol chip 111; however, by providing a virtual queue, the man-hours involved in modifying the microprocessor package 13 can be kept to a minimum.

Returning to the description of the command processing in FIG. 3, upon transferring a read command to the VRSP_Q in step SP6, the controller 11211 updates the VRSP_PI (Virtual ReSPonse_Producer Index) in the local memory 132 (SP7), and updates the RSP_CI (ReSPonse_Consumer Index) in the protocol chip 111 (SP8).

The VRSP_PI is a pointer which is provided in the local memory 132. The VRSP_PI manages VRSP_Q updates, and when the VRSP_Q is updated, stores the address of the updated VRSP_Q.

The RSP_CI is a pointer which is provided in the register in the protocol chip 111. The RSP_CI manages the end of processing of the real RSP_Q updates, and here, when the processing from when a read command which is stored in the real RSP_Q is read up until the converted read command is transferred to the VRSP_Q (SP5 to SP7) is complete, stores the address of the real RSP_Q storing the command being processed. The processor 1111 is able to determine the progress status of the command transfer by detecting RSP_CI updates.

Thereafter, the microprocessor 131 (MP0 among the plurality of microprocessors MP0 to MP7 in FIG. 3) monitors the VRSP_PI at regular intervals, and upon detecting that the VRSP_PI has been updated (SP9), determines that a command which is to be transferred to the disk adapter package 14 is stored in the VRSP_Q.

The microprocessor 131 subsequently reads the read command from the VRSP_Q (SP10) and updates the VRSP_CI (Virtual ReSPonse_Consumer Index) in the internal memory 11212 (SP11).

The VRSP_CI is a pointer which is provided in the internal memory 11212. The VRSP_CI manages the completion of processing of the VRSP_Q update, and here, when the processing in which the read command stored in the VRSP_Q is read (SP10), stores the address of the VRSP_Q storing the command being processed. The controller 11211 is able to determine the progress status of the command transfer by detecting VRSP_CI updates.

In addition, the microprocessor 131 analyzes the read command read from the VRSP_Q. Note that although the premise of the description here is that this command is a read command, from the standpoint of the microprocessor 131, the microprocessor 131 analyzes the command thus read here and determines whether the command is a read command or a write command. When the result of the analysis is that the command from the IORP 1121 is a command requesting that read data be read from the disk unit 15 (a read command), the microprocessor 131 transfers the read command to the VREQ_Q (Virtual REQuest_Queue) in the external memory 143 (SP12).

The VREQ_Q is a virtual queue for storing virtual commands which are issued from the microprocessor 131.

The microprocessor 131 then updates the VREQ_PI (Virtual REQuest_Producer Index) in the internal memory 14212 (SP13).

The VREQ_PI is a pointer which is provided in the internal memory 14212. The VREQ_PI manages VREQ_Q updates, and when the VREQ_Q is updated, stores the address of the updated VREQ_Q.

The controller 14211 in the IORP 1421 monitors the VREQ_PI at regular intervals, and when it is detected that the VREQ_PI has been updated (SP14), determines that the command to be transferred to the protocol chip 141 is stored in the VREQ_Q in the external memory 143.

The IORP 1421 subsequently reads read commands from the VREQ_Q in the external memory 143 (SP15) and, after converting the read command thus read into a read command based on an actual communication protocol, transfers the converted read command to a real REQ_Q (REQuest_Queue) in the external memory 143 (SP16).

The real REQ_Q is a real queue for storing commands issued to the disk unit 15 on the basis of an actual communication protocol such as the FC protocol or FCoE protocol.

When the read command is transferred to the real REQ_Q in step SP16, the controller 14211 updates the REQ_PI (REQuest_Producer Index) in the protocol chip 141 (SP17), and updates the VREQ_CI (Virtual REQuest_Consumer Index) in the local memory 132 (SP18).

The REQ_PI is a pointer which is provided in the register in the protocol chip 141. The REQ_PI manages real REQ_Q updates, and when the real REQ_Q is updated, stores the address of the updated real REQ_Q.

The VREQ_CI is a pointer which is provided in the local memory 132. The VREQ_CI manages the completion of processing of VREQ_Q updates and here, when the processing, from the time when the read command stored in the VREQ_Q is read, up until when the converted read command is transferred to the real REQ_Q (SP15 and SP16) is complete, the VREQ_CI stores the address of the VREQ_Q storing the command being processed. The microprocessor 131 is able to determine the progress status of the command transfer by detecting VREQ_CI updates.

The processor 1411 in the protocol chip 141 monitors the REQ_PI at regular intervals, and when it is detected that the REQ_PI has been updated (SP19), determines that a command which is to be transferred to the disk unit 15 is stored in the real REQ_Q in the external memory 143.

The processor 1411 subsequently reads the read command from the real REQ_Q in the external memory 143 (SP20) and updates the REQ_CI (REQuest_Consumer Index) (SP21).

The REQ_CI is a pointer which is provided in the register in the protocol chip 141. The REQ_CI manages the completion of processing of real REQ_Q updates, and here, when the processing up until the read command stored in the real REQ_Q is read (SP20) is complete, stores the address of the real REQ_Q storing the command being processed. The processor 1411 is able to determine the progress status of the command transfer by detecting REQ_CI updates.

The processor 1411 then transmits read commands read in step SP20 to the disk unit 15 (SP22) and ends the command processing.

Note that, when the read command is transmitted to the disk unit 15, read data is read in the disk unit 15 and the read data thus read is transferred from the disk adapter package 14 to the channel adapter package 11 via the microprocessor package 13 and is ultimately transmitted to the host 2.

Further, a response command which issues notification that the read data transmission is complete is subsequently issued by the disk unit 15 and is ultimately transmitted to the host 2 via the disk adapter package 14, the microprocessor package 13, and the channel adapter package 11.

FIGS. 4A to 4D show the flow of commands according to this embodiment. Here, the flow of commands in a case where the command is a read command will be described.

Figure 4A:
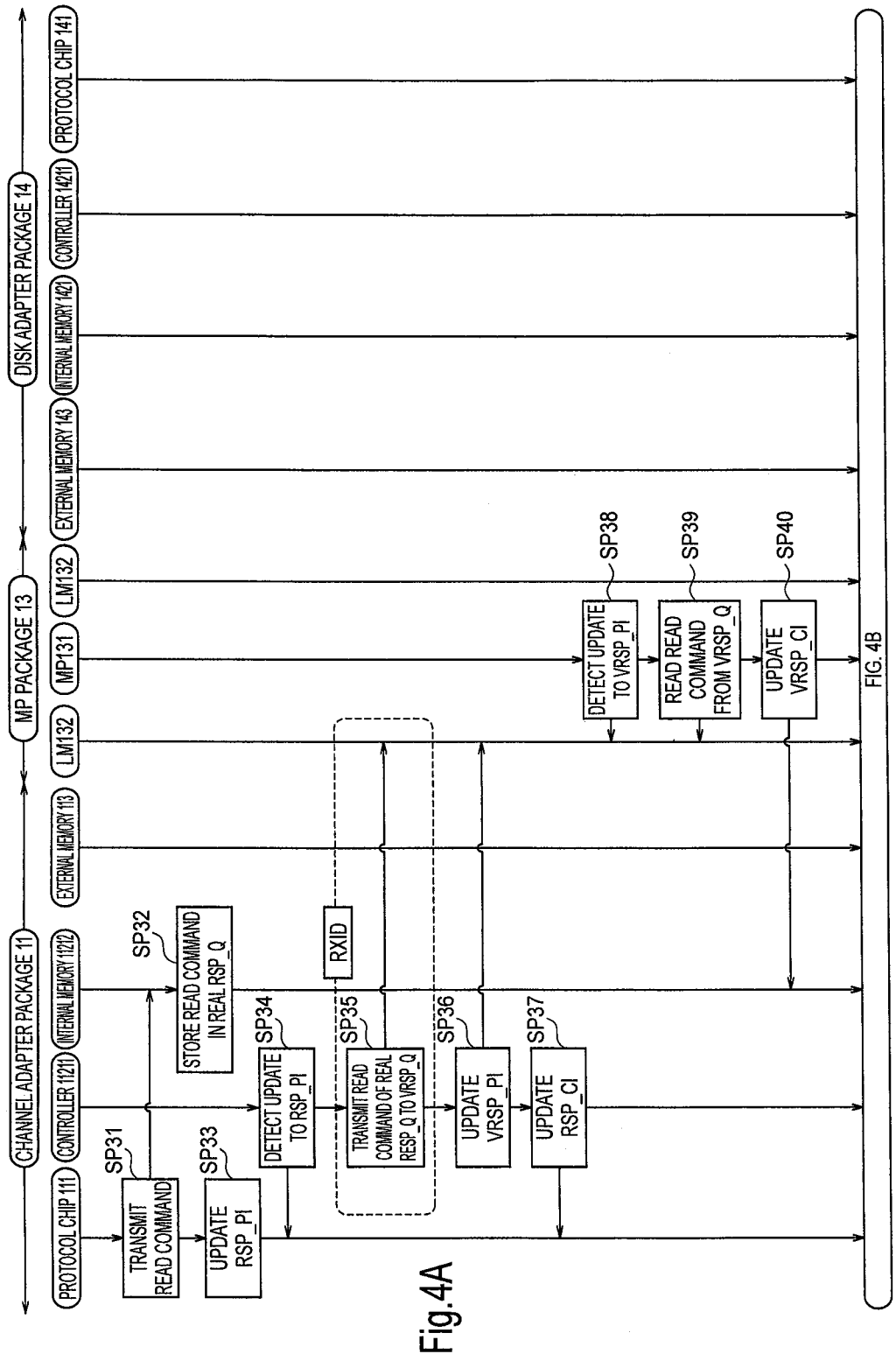
FIG. 4A is a flowchart showing the flow of command processing according to this embodiment.
Figure 4B:
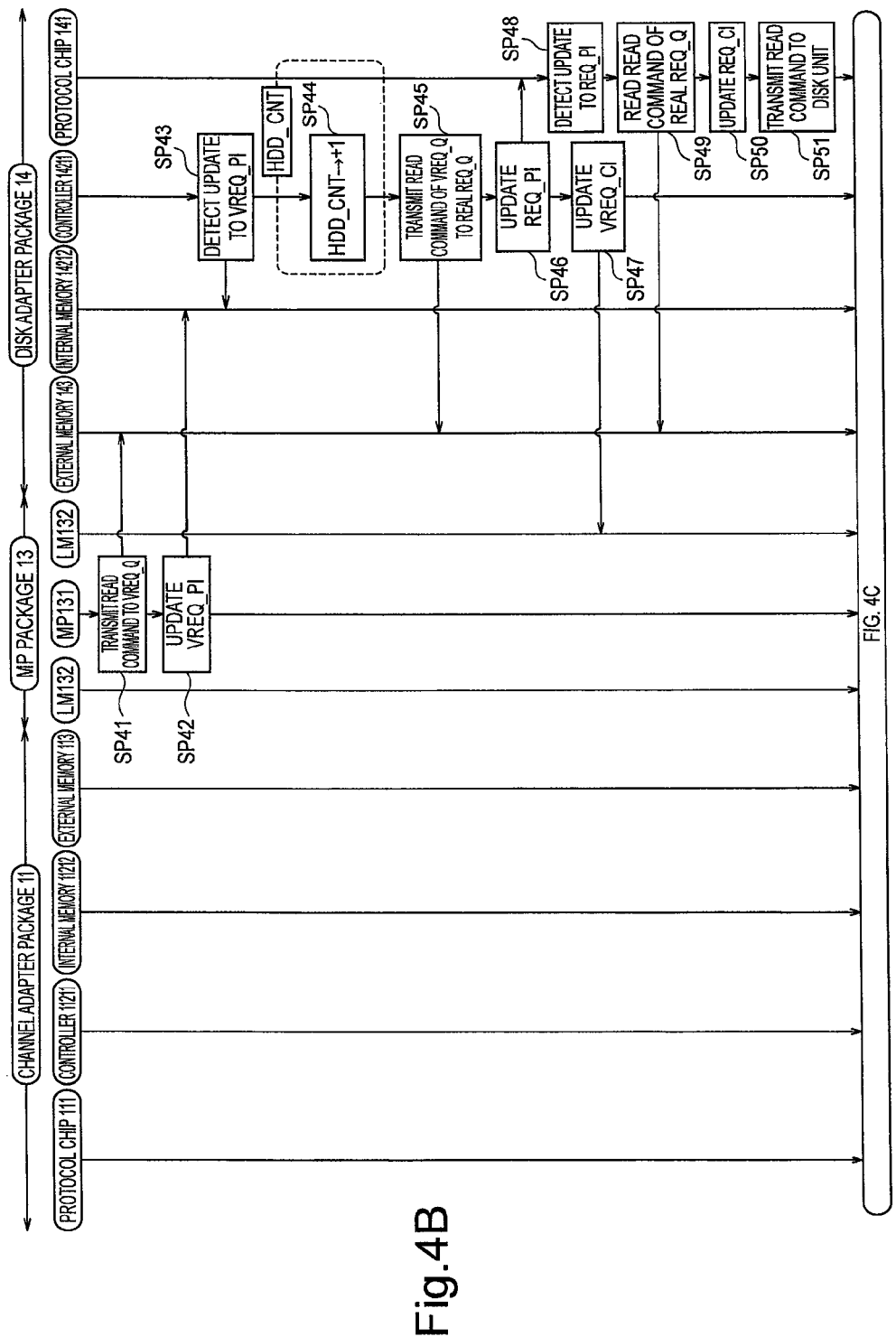
FIG. 4B is a flowchart showing the flow of command processing according to this embodiment.

Note that FIG. 4A shows processing which corresponds to the processing of steps SP1 to SP11 in FIG. 3, and FIG. 4B shows processing which corresponds to the processing of steps SP12 to SP22 in FIG. 3. In other words, FIGS. 4A and 4B show the flow of a series of commands in which read commands from the host 2 are transmitted to the disk unit 15.

Figure 4C:
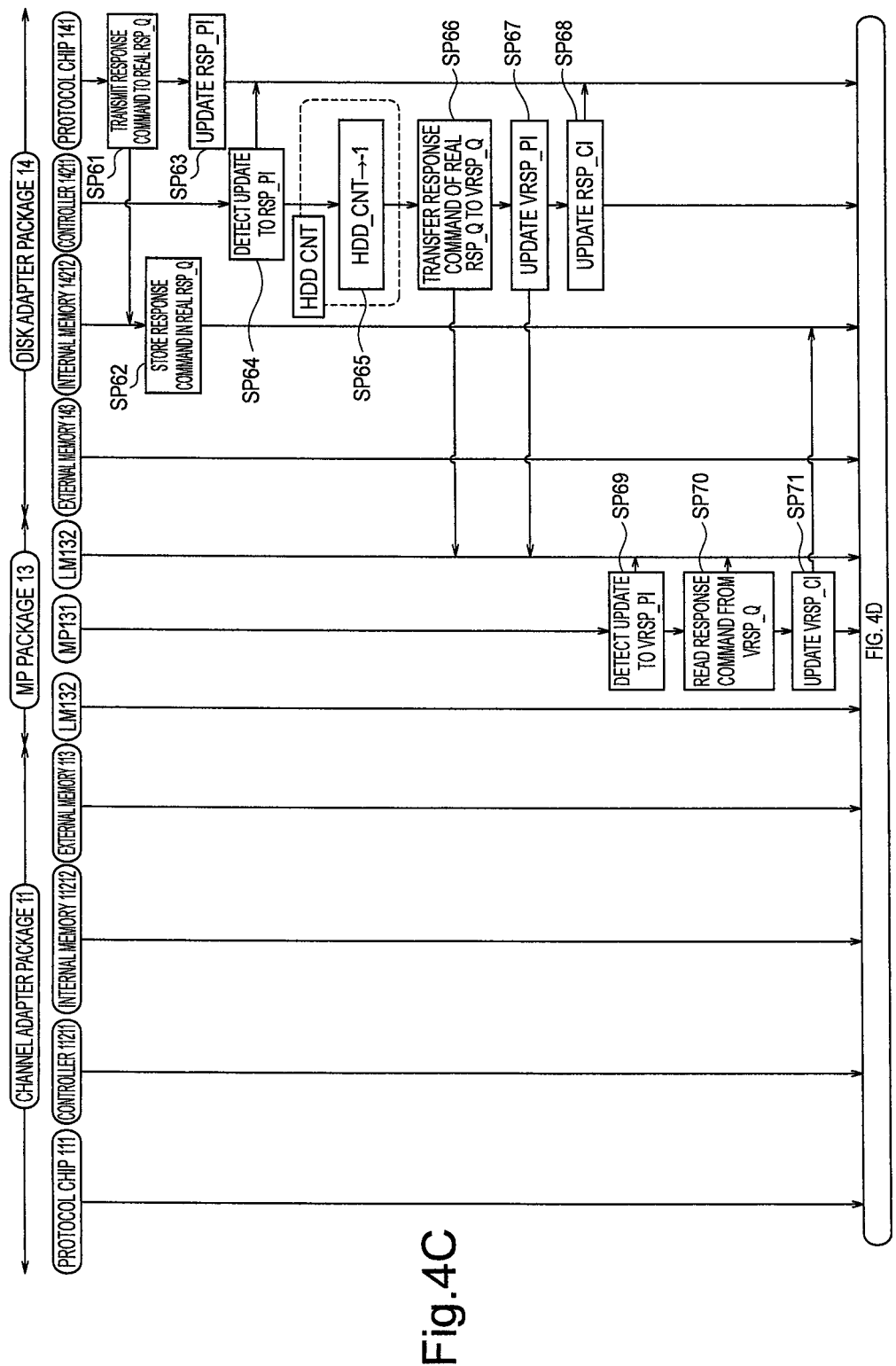
FIG. 4C is a flowchart showing the flow of command processing according to this embodiment.

Further, FIGS. 4C and 4D show processing in the reverse order to FIGS. 4A and 4B, that is, FIGS. 4C and 4D show processing in which response commands from the disk unit 15 are transferred to the disk adapter package 14, the microprocessor package 13, and the channel adapter package 11 in that order and ultimately transmitted to the host 2.

First, when the protocol chip 111 receives a read command from the host 2, the protocol chip 111 transmits the received read command to the internal memory 11212 (SP31). When the internal memory 11212 stores the read command in the real RSP_Q in the internal memory 1121 (SP32), the protocol chip 111 updates the RSP_PI in the protocol chip 111 (SP33).

Thereafter, upon detecting an update of the RSP_PI in the protocol chip 111 (SP34), the controller 11211 reads and converts read commands stored in the real RSP_Q in the internal memory 11212 and transmits the converted read command to the VRSP_Q in the local memory 132 (SP35).

Figures 11, 12:
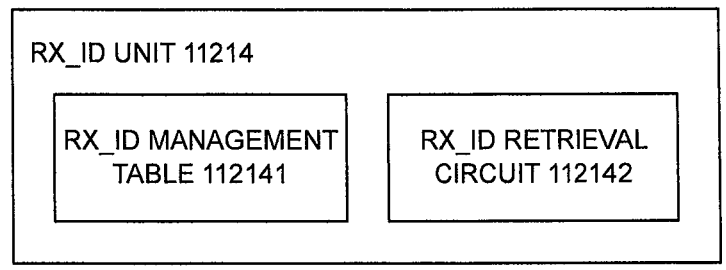
FIG. 11 is an internal constitutional view of an RX_ID.
FIG. 12 is a logical constitutional view of an RX_ID management table.
Figure 13:
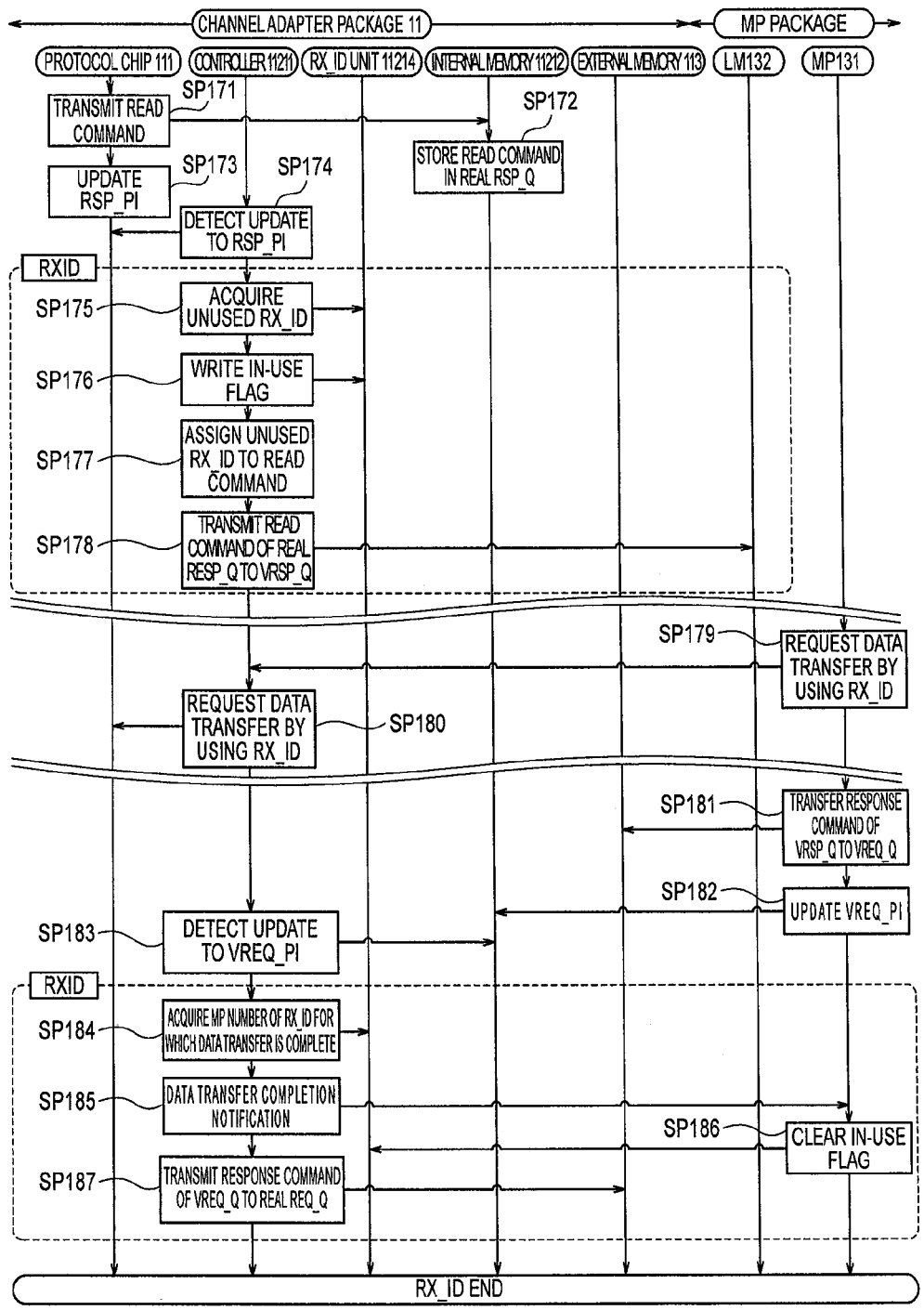
FIG. 13 is a flowchart showing processing of an RX_ID unit.

Here, according to this embodiment, the controller 11211 assigns an unused RX_ID issued by the RX_ID unit 11214 to the read command and subsequently transmits the RX-ID-assigned read command to the VRSP_Q in the local memory 132. Since the unused RX_IDs whose usage is shared by all the microprocessors are dynamically assigned by the RX_ID unit 11214, even in a case where the processing focuses on one microprocessor, depletion of the RX_IDs can be avoided and processing delays caused by waiting for an RX_ID to be issued can be prevented. Details of the processing of the RX_ID unit 11214 will be described subsequently (FIGS. 11 to 13).

After transferring the read command to the VRSP_Q in the local memory 132 in step SP35, the controller 11211 updates the VRSP_PI in the local memory 132 (SP36), and updates the RSP_CI in the protocol chip 111 (SP37).

Upon detecting an update to the VRSP_PI in the local memory 132 (SP38), any MP in the microprocessor 131 reads a read command stored in the VRSP_Q (SP39) and updates the VRSP_CI in the internal memory 11212 (SP40).

The microprocessor 131 subsequently transmits the read command thus read in step SP39 to the VREQ_Q in the external memory 143 (SP41) and updates the VREQ_PI in the internal memory 14212 (SP42). When the VREQ_PI is updated, the controller 14211 detects the update (SP43).

Figure 8:
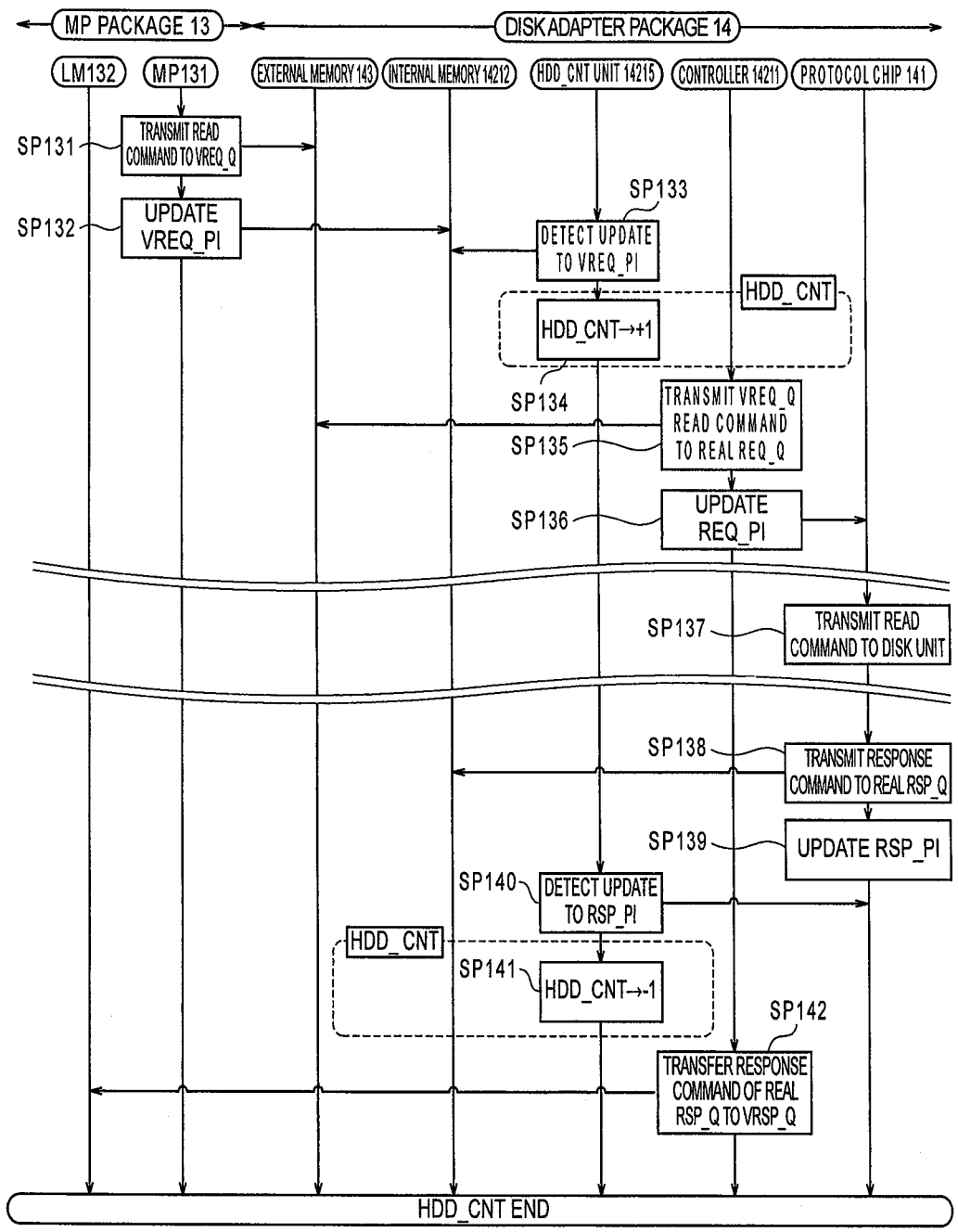
FIG. 8 is a flowchart showing HDD_CNT processing.
Figure 9:
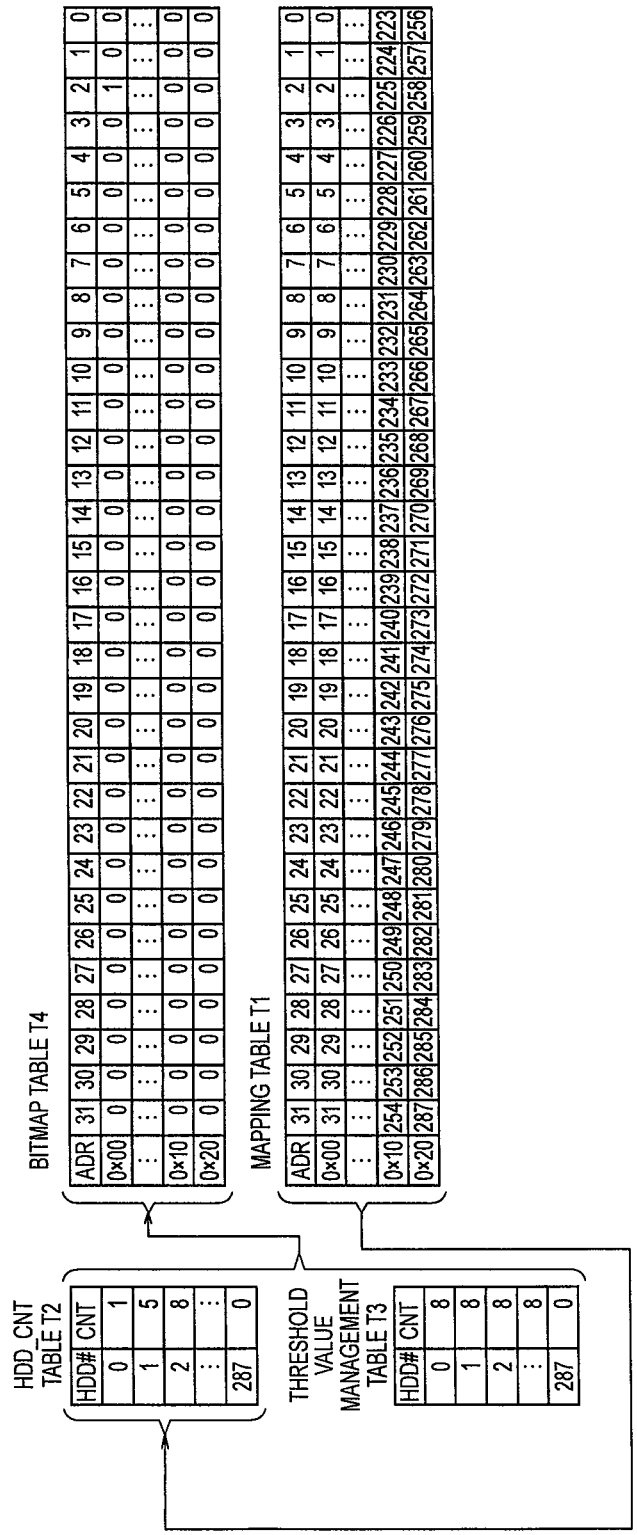
FIG. 9 is a logical constitutional view of various tables which are used in an HDD_CNT unit.
Figure 10:
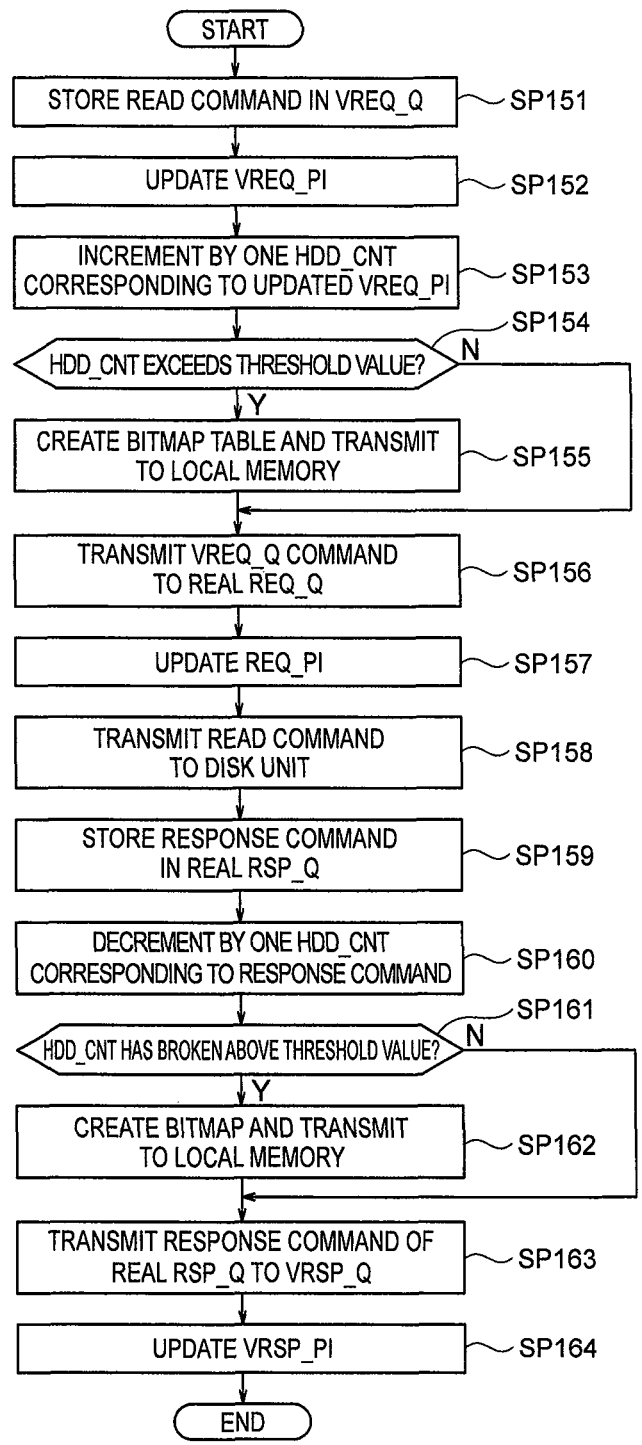
FIG. 10 is a flowchart showing HDD_CNT processing.

Here, according to this embodiment, upon detecting an update to the VREQ_PI in the internal memory 14212, the controller 14211 increments by one the count managed for the hard disk, among the hard disks in the disk unit 15, which is managing the command stored in the VREQ_Q (SP44). At this time, when the incremented count has exceeded a threshold value, the controller 1421 notifies the microprocessor 131 that that hard disk currently has a high load and is able to request that, from that point forward, commands not be issued to the hard disk. Details of the processing of the HDD_CNT unit 14215 will be described subsequently (FIGS. 8 to 10).

Upon detecting an update to the VREQ_PI in the internal memory 14212 in step SP43, the controller 14211 reads and converts the read command stored in the VREQ_Q in the external memory 143 and transmits the converted read command to the real REQ_Q in the external memory 143 (SP45). The controller 14211 then updates the REQ_PI in the protocol chip 141 (SP46) and updates the VREQ_CI in the local memory 132 (SP47).

Upon detecting the REQ_PI update (SP48), the protocol chip 141 reads the read command which is stored in the real REQ_Q in the external memory 143 (SP49) and, after updating the REQ_CI (SP50), transmits the read command thus read to the disk unit 15 (SP51).

The flow of command processing in which the read command from the host 2 is transferred to the channel adapter package 11, the microprocessor package 13, and the disk adapter package 14 in that order up until the read command is ultimately transmitted to the disk unit 15 was described hereinabove.

After this command processing, the disk unit 15 transmits read data to the disk adapter package 14 on the basis of the received read command. The read data transmitted to the disk adapter package 14 is transferred to the disk adapter package 14, the microprocessor package 13, and the channel adapter package 11 in that order and is ultimately transmitted to the host 2. When the entire read data transmission is complete, a response command notifying that the read data transmission is complete is then transmitted.

The flow of response command processing after all the read data is transmitted will now be described with reference to FIGS. 4C and 4D.

First, when the protocol chip 141 receives the response command from the disk unit 15, the protocol chip 141 transmits the received response command to the internal memory 14212 (SP61). When the internal memory 14212 stores the response command in the real RSP_Q (SP62), the protocol chip 141 updates the RSP_PI (SP63).

When the controller 14211 detects the update to the RSP_PI in the protocol chip 141 (SP64), the HDD_CNT unit 14215 decrements by one the count for managing the hard disk which actually processed the read command among the hard disks in the disk unit 15 (SP65). Details of the processing of the HDD_CNT unit 14125 will be described subsequently (FIGS. 8 to 10).

The controller 14211 subsequently reads and converts the response command stored in the real RSP_Q in the internal memory 14212 and transmits the converted response command to the VRSP_Q in the local memory 132 (SP66).

After transmitting the response command to the VRSP_Q in step SP66, the controller 14211 updates the VRSP_PI in the local memory 132 (SP67) and updates the RSP_CI in the protocol chip 141 (SP68).

Upon detecting an update to the VRSP_PI in the local memory 132 (SP69), any of the MPs in the microprocessor 131 reads the response command stored in the VRSP_Q in the local memory 132 (SP70) and updates the VRSP_CI in the internal memory 14212 (SP71).

The microprocessor 131 transmits the read command read in step SP70 to the VREQ_Q in the external memory 113 (SP81), and updates the VREQ_PI in the internal memory 11212 (SP82).

The controller 11211 then detects the update to the VREQ_PI in the internal memory 11212 (SP83).

Here, according to this embodiment, the PI_CHK unit 11213 actually detects the update to the VREQ_PI in the internal memory 11212. To describe this in detail, the PI_CHK unit 11213 monitors access to the internal memory 11212, and when access to the internal memory 11212 is made from the microprocessor 131 (when there is a VREQ_PI update), the PI_CHK unit 11213 detects this fact and performs an update by writing the address in the accessed internal memory 11212 (address of the VREQ_PI) to the IR 11211A. Accordingly, as a result of detecting the update to the IR 11211A, the controller 11211 is able to detect the update to the VREQ_PI in the internal memory 11212.

Figure 5:
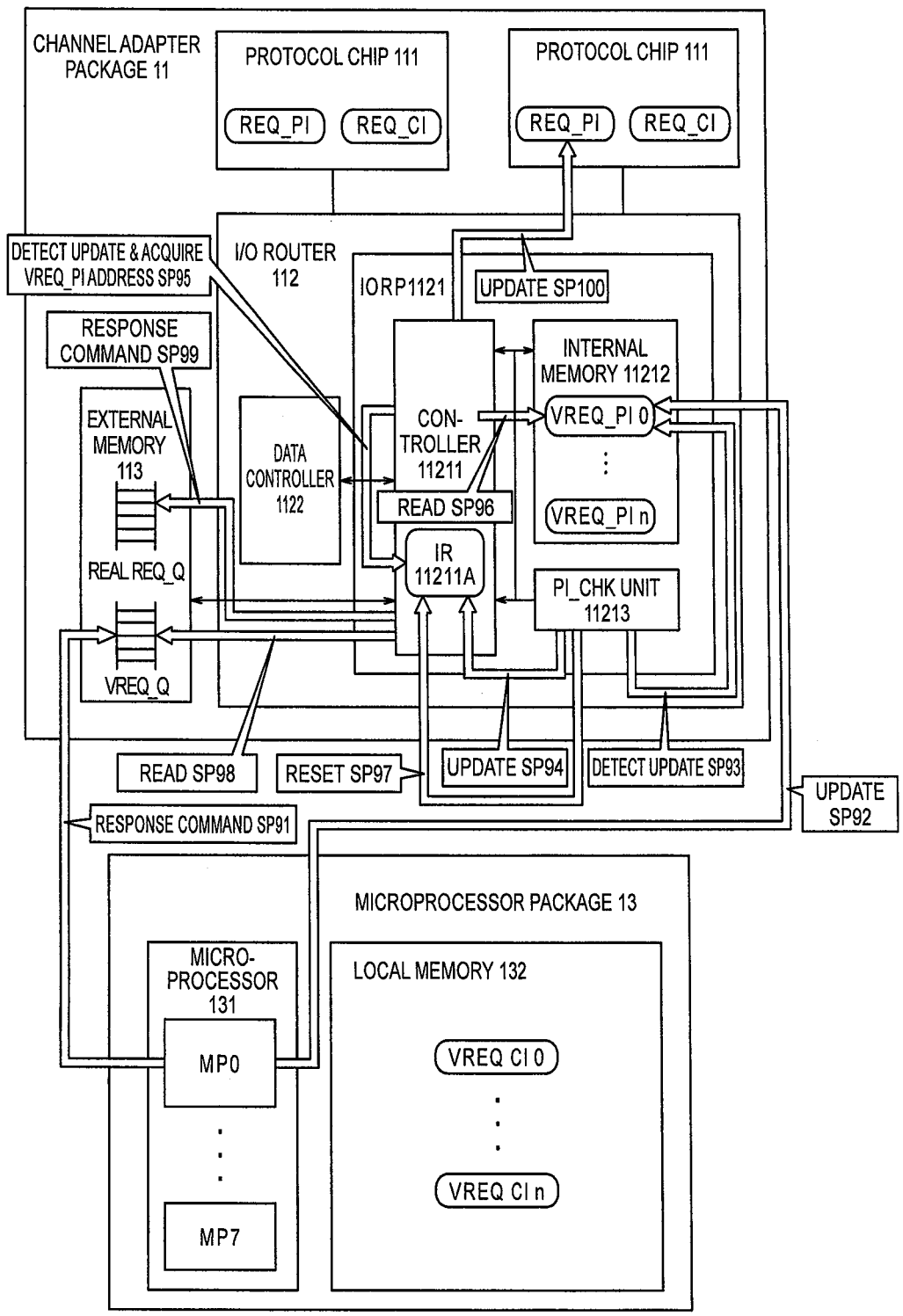
FIG. 5 is a conceptual view of PI check processing.
Figure 6:
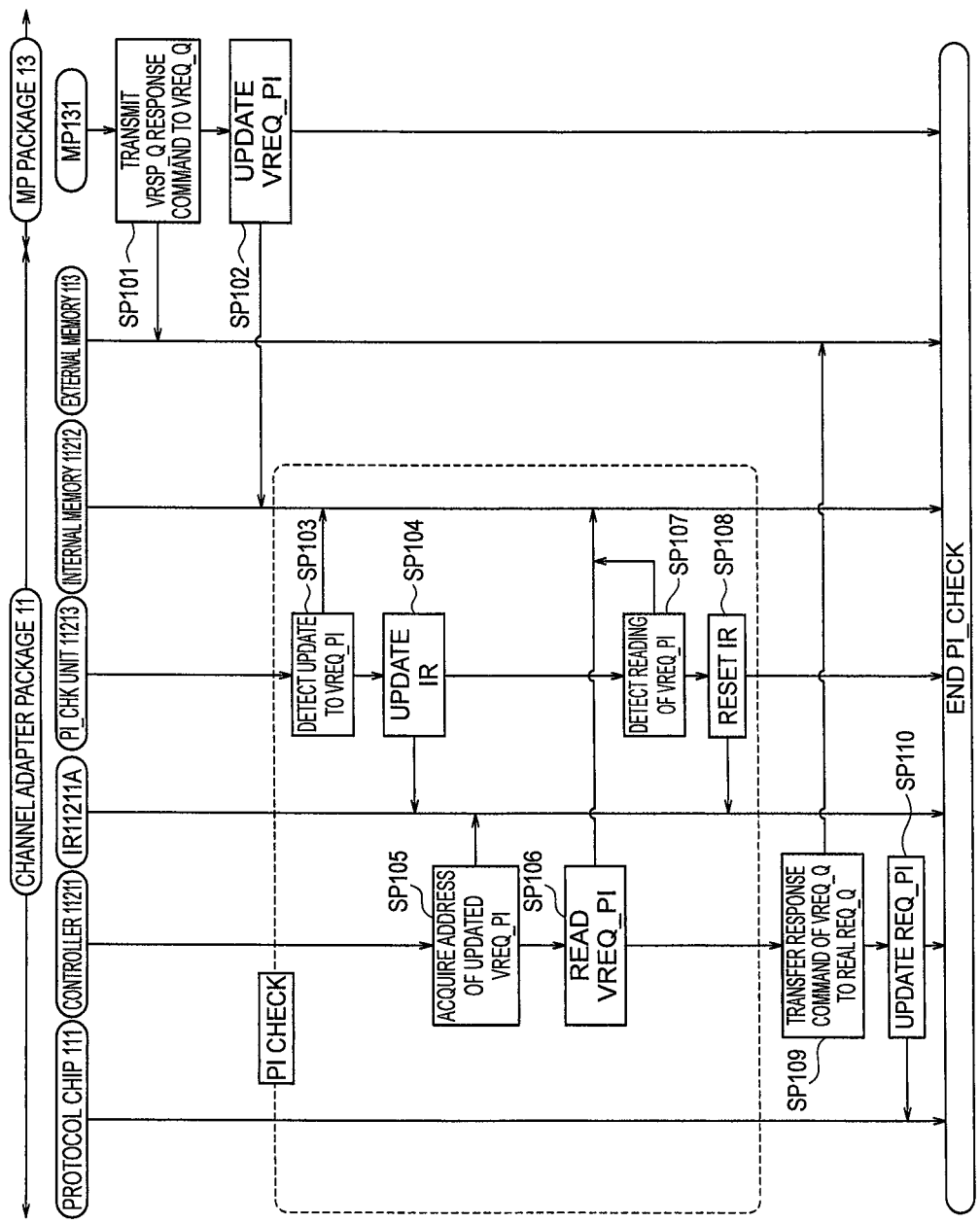
FIG. 6 is a flowchart showing PI check processing.
Figure 7:
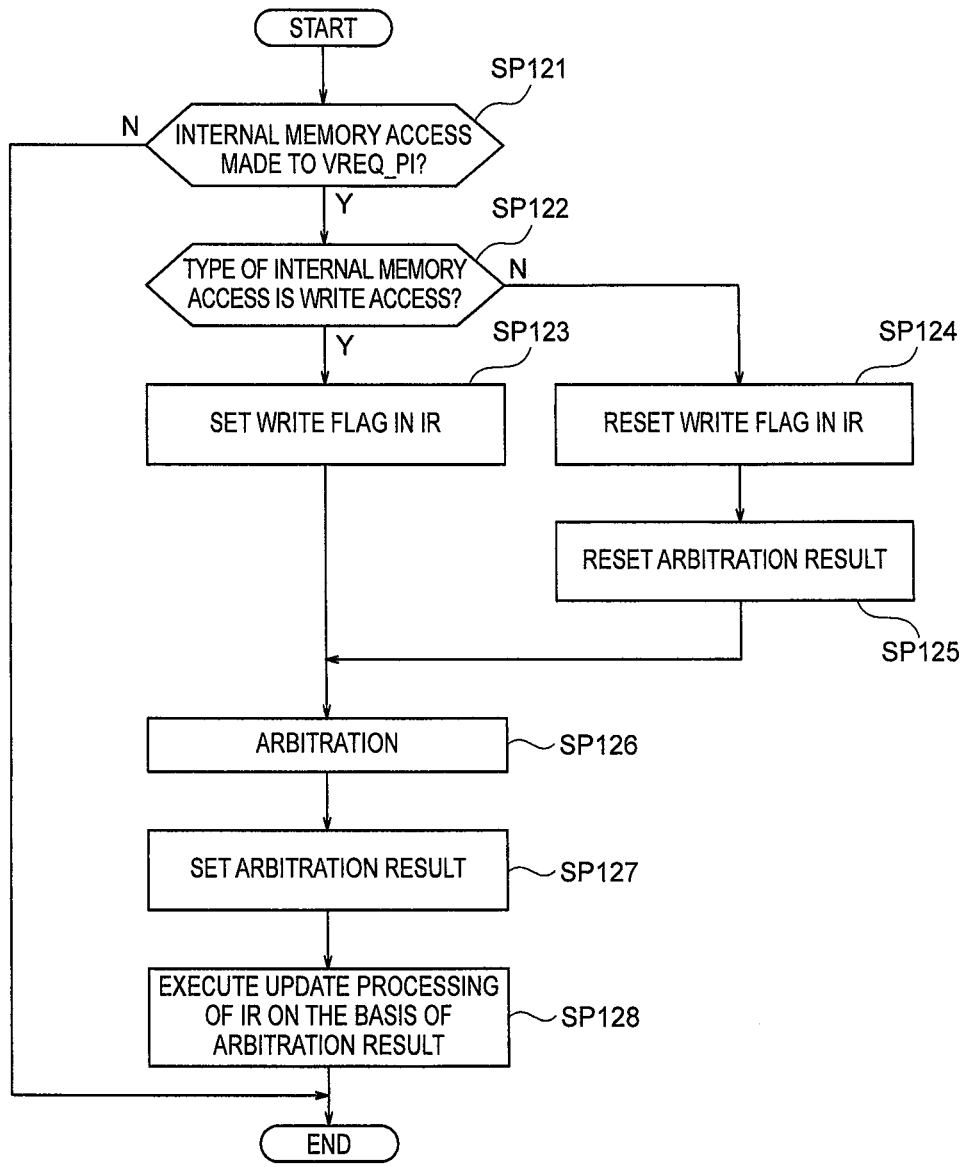
FIG. 7 is a flowchart showing PI check processing.

As a result of detecting the update to the VREQ_PI in the internal memory 11212 via the processing by the PI_CHK unit 11213 as per this embodiment, the controller 11211, which would conventionally detect updates to the VREQ_PI by performing separate polling of each VREQ_PI provided for each microprocessor, is able, without polling, to detect updates to the VREQ_PI simply by detecting updates to the IR 11211A. The processing speed can thus be improved. Further, the controller 11211 is able to reduce the time taken for polling because the IR 11211A is polled which is a shorter physical distance away than the internal memory 11212. Details of the processing of the PI_CHK unit 11213 will be described subsequently (FIGS. 5 to 7).

Returning now to the description of the command processing in FIG. 4D, upon detecting the update to the VREQ_PI in the internal memory 11212 in step SP83, the controller 11211 reads and converts the response command stored in the VREQ_Q in the external memory 113 and transmits the converted response command to the real REQ_Q in the external memory 113 (SP84).

Here, according to this embodiment, the controller 11211 performs processing to release the RX_ID being used which is assigned to the response command (the RX_ID assigned by the RX_ID unit 11214 in step SP35) because the command processing has ended. The released RX_ID is re-assigned by the RX_ID unit 11214 to another read command as a usable RX_ID.

After the response command is transmitted to the real REQ_Q in step SP84, the controller 11211 updates the REQ_PI in the protocol chip 111 (SP85) and updates the VREQ_CI in the local memory 132 (SP86).

Upon detecting the update to the REQ_PI in the protocol chip 111, the protocol chip 111 reads the response command which is stored in the real REQ_Q in the external memory 113 (SP87), and updates the REQ_CI (SP88). The protocol chip 111 then transmits the read response command to the host 2 (SP89).

The flow of processing in which the response command from the disk unit 15 is transferred to the disk adapter package 14, the microprocessor package 13, and the channel adapter package 11 in that order up until the command is ultimately transmitted to the host 2 was described hereinabove.

(4) PI_CHK

FIG. 5 shows a conceptual view of a PI check. This PI check is processing which is executed by the IORP 1121 and is processing which is executed with the timing of step S83 in FIG. 4D. In this PI check, the IORP 1121 rapidly detects the response command from the microprocessor 131 and quickly transfers the response command to the protocol chip 111, and performing the PI check enables high speed processing.

First, the microprocessor 131 (MP0) stores the response command in the VREQ_Q in the external memory 113 (SP91), and when the VREQ_PI in the internal memory 11212 associated with each microprocessor 131 is updated (SP92), the PI check is executed in the IORP 1121.

Note that, here, since the VREQ_PI0 is associated with the MP0, the MP0 updates the VREQ_PI0. The VREQ_PI is a pointer which is secured in the internal memory 11212 in a quantity equal to the number of microprocessors. Accordingly, when there is a total of 128 microprocessors, for example, 128 of the VREQ_PI are also prepared.

The PI_CHK unit 11213 in the IORP 1121 continuously monitors access to the internal memory 11212, and when access is made to the internal memory 11212 from the microprocessor 131, the PI_CHK unit 11213 detects this access (SP93), and performs an update by writing the address in the accessed internal memory 11212 (the address of VREQ_PI0) to the IR 11211A (SP94).

Upon detecting an update to the IR 11211A (SP95), the controller 11211 acquires the address in the internal memory 11212 written to the IR 11211A (SP96) and reads the acquired address (VREQ_PI0) in the internal memory 11212 (SP96). Since access is made to the internal memory 11212 from the controller 11211 in step SP96, the PI_CHK unit 11213 detects this access and resets the IR 11211A (SP97).

The controller 11211 reads the address (VREQ_Q) in the external memory 113 stored in the VREQ_PI0 which was read in step SP96 (SP98). Further, the controller 11211 converts the response command which is stored in the read VREQ_Q and stores the converted response command in the real REQ_Q in the external memory 113 (SP99).

The controller 11211 then updates the REQ_PI in the protocol chip 111 (SP100) and ends the PI check.

Thus, the controller 11211 is able to detect updates to the VREQ_PI in the internal memory 11212 via the processing by the PI_CHK unit 11213. Conventionally, the controller 11211, which would conventionally detect updates to the VREQ_PI by performing separate polling of each VREQ_PI provided for each microprocessor, is able, without polling, to detect updates to the VREQ_PI simply by detecting updates to the IR 11211A. The processing speed can thus be improved. Further, the controller 11211 is able to reduce the time taken for polling because the IR 11211A is polled which is a shorter physical distance away than the internal memory 11212.

FIG. 6 shows a detailed processing routine for the PI check. The microprocessor 131 transmits the response command, which is stored in the VRSP_Q in the local memory 132, to the VREQ_Q in the external memory 113 (SP101), and when the VREQ_PI in the internal memory 11212 is updated (SP102), the PI check is executed in the IORP 1121.

When access is made to the internal memory 11212 from the microprocessor 131, the PI_CHK unit 11213 in the IORP 1121 detects this access (SP103) and performs an update by writing the address of the VREQ_PI in the accessed internal memory 11212 to the IR 11211A (SP104).

Upon detecting the update to the IR 11211A, the controller 11211 acquires the address of the VREQ_PI in the internal memory 11212 written to the IR 11211A (SP105), and reads the VREQ_PI (SP106). Here, because access has been made to the internal memory 11212 from the controller 11211, the PI_CHK unit 11213 detects this access (SP107) and resets the IR 11211A (SP108).

The controller 11211 reads the address of the VREQ_Q in the external memory 113 stored in the VREQ_PI read in step SP106 and reads the response command stored in the VREQ_Q. The controller 11211 then converts the read response command and stores the converted response command in the real REQ_Q in the external memory 113 (SP109).

The controller 11211 subsequently updates the REQ_PI in the protocol chip 111 (SP110) and ends the PI check.

FIG. 7 shows the processing routine of the PI_CHK unit 11213 in the PI check processing. First, upon detecting access to the internal memory 11212, the PI_CHK unit 11213 determines whether or not the detected access is access to the VREQ_PI in the internal memory 11212 (SP121).

Upon obtaining a negative result in the determination of step SP121, the PI_CHK unit 11213 ends the processing. If, on the other hand, an affirmative result is obtained in the determination of step SP121, the PI_CHK unit 11213 determines whether or not the type of access to the VREQ_PI is write [access] (SP122).

Upon obtaining an affirmative result in the determination of step SP122, the PI_CHK unit 11213 sets the write flag in the IR 11211A (SP123). If, on the other hand, a negative result is obtained in the determination of step SP122, the PI_CHK unit 11213 resets the write flag in the IR 11211A (SP124). Further, the PI_CHK unit 11213 resets the saved arbitration result (SP125).

The PI_CHK unit 11213 similarly executes the processing of steps SP121 to SP125 a number of times equal to the number of microprocessors. The PI_CHK unit 11213 then executes arbitration in order to determine the priority ranking of the update to the IR 11211A when access has been made to the VREQ_PI from a plurality of microprocessors (SP126).

The PI_CHK unit 11213 then sets the arbitration result (SP127) and executes update processing on the IR 11211A on the basis of this set arbitration result (SP128) and ends the PI check.

(5) HDD_CNT

FIG. 8 shows the processing routine of HDD_CNT processing. The HDD_CNT processing is processing which is executed by the HDD_CNT unit 14215 and is processing which is executed with the timing of step SP44 in FIG. 4B and step SP65 in FIG. 4C. This HDD_CNT processing enables the IORP 1421 to request that the microprocessor 131 not issue commands to a hard disk which currently has a high load, and executing the HDD_CNT processing enables distribution of the load on the hard disk.

The microprocessor 131 transmits the read command thus read from the VRSP_Q in the local memory 132 to the VREQ_Q in the external memory 143 (SP131), and upon updating the VREQ_PI in the internal memory 14212 (SP132), the HDD_CNT processing is executed in the IORP 1421.

Upon detecting the update to the VREQ_PI in the internal memory 14212 (SP133), the HDD_CNT unit 14215 in the IORP 1421 increments by one the count managing the hard disk which processes the read command stored in the VREQ_Q among the hard disks in the disk unit 15 (SP134).

After reading and converting the read command stored in the VREQ_Q in the external memory 143, the controller 14211 transmits the converted read command to the real REQ_Q (SP135). The controller 14211 then updates the REQ_PI in the protocol chip 141 (SP136).

Upon detecting the update to the REQ_PI in the protocol chip 141, the protocol chip 141 reads the read command stored in the real REQ_Q in the external memory 143 and transmits the read command to the disk unit 15 (SP137).

When the read command is transmitted to the disk unit 15, the read data is read by any hard disk in the disk unit 15, and is transferred to the disk adapter package 14, the microprocessor package 13, and the channel adapter package 11 in that order, and is ultimately transmitted to the host 2. Thereafter, the response command is transmitted from the disk unit 15 to the protocol chip 141.

Upon receiving the response command from the disk unit 15, the protocol chip 141 transmits the response command to the real RSP_Q in the internal memory 14212 (SP138) and updates the RSP_PI in the protocol chip 141 (SP139).

Upon detecting updates to the SP_PI in the protocol chip 141 (SP140), the HDD_CNT unit 14215 in the IORP 1421 decrements by one the count managed for the hard disk managing the read command among the hard disks in the disk unit 15 (SP141).

The IORP 1421 reads and converts the response command stored in the real REQ_Q in the internal memory 14212 and transmits the converted response command to the VRSP_Q in the local memory 132 (SP142) and ends the processing of the HDD_CNT.

FIG. 9 shows tables T1 to T4 which are held and managed by the HDD_CNT unit 14215.

Mapping table T1 is a table for managing the addresses and hard disk numbers in the internal memory 14212 by associating the addresses with the hard disk numbers. Therefore, in the case of FIG. 9, it can be seen that the bit "0" with the address "0x00" in the internal memory 14212 indicates the hard disk number "0".

A HDD_CNT table T2 is a table for managing hard disk numbers and counts by associating the hard disk numbers with the counts. The HDD_CNT table T2 is successively updated such that, when a command is issued to a hard disk, the HDD_CNT table T2 increments by one the count corresponding to the hard disk for which the command was issued, and conversely, when a command is issued from the hard disk, the HDD_CNT table T2 decrements by one the count corresponding to the hard disk which issued the command. Therefore, in the case of FIG. 9, it can be seen that the current count "8" is associated with the hard disk with the hard disk number "2", for example.

A threshold value management table T3 is a table for managing the hard disk numbers and threshold values by associating the hard disk numbers with the threshold values. The threshold values may be predefined or may be suitably changed. Hence, in the case of FIG. 9, for example, it can be seen that management is performed such that the threshold value "8" is associated with the hard disk with the hard disk number "2". When referencing the HDD_CNT table T2, since the count for the hard disk with the hard disk number "2" is "8", the bitmap table T4 for notifying the microprocessor 131 is created to not issue a command from that point forward to that hard disk.

The bitmap table T4 is a table which associates the addresses in the internal memory 14212 with bits indicating that the threshold value has been exceeded. The bit locations in the bitmap table T4 and the hard disk numbers are mapped according to the mapping table T1. Hence, in the case of FIG. 9, since a bit 2 in a location corresponding to the address "0x00" in the internal memory 14212 is "1", it can be seen from the mapping table T1 that the hard disk number "2" is over the command threshold value and hence commands should be transmitted to hard disks other than the hard disk with the hard disk number "2".

FIG. 10 shows a detailed processing routine for HDD_CNT processing. The microprocessor 131 stores a read command, which has been stored in the VRSP_Q in the local memory 132, in the VREQ_Q in the external memory 143 (SP151), and when the VREQ_PI is updated (SP152), the HDD_CNT processing is executed in the IORP 1421.

The HDD_CNT unit 14215 in the IORP 1421 acquires the hard disk number at the issuing destination from the read command stored in the VREQ_Q. The HDD_CNT unit 14215 then references the HDD_CNT table T2 and increments by one the count associated with the acquired hard disk number (SP153).

The HDD_CNT unit 14215 then references the threshold value management table T3 to determine whether there are counts exceeding the threshold value (or breaking above the threshold value) among the counts which are managed in the HDD_CNT table T2 (SP154).

When an affirmative result is obtained in the determination of step SP154, the HDD_CNT unit 14215 creates the bitmap table T4 and transmits the created bitmap table T4 to the local memory 132 in the microprocessor 13 (SP155). If, on the other hand, a negative result is obtained in the determination of step SP154, the HDD_CNT unit 14215 moves to step SP156.

The controller 14211 reads and converts the read command stored in the VREQ_Q in step SP151 and transmits the converted read command to the real REQ_Q (SP156). The controller 14211 then updates the REQ_PI in the protocol chip 141 (SP157).

When the update to the REQ_PI is detected, the protocol chip 141 reads the read command stored in the real REQ_Q in the external memory 143, updates the REQ_CI, and transmits the read command to the corresponding hard disk in the disk unit 15 (SP158). After the read data in the hard disk which has received the read command has been read, a response command is then transmitted from the hard disk to the disk adapter package 14.

Upon receiving the response command from the hard disk, the protocol chip 141 stores the received response command in the real RSP_Q in the internal memory 14212 (SP159). The HDD_CNT unit 14215 references the HDD_CNT table T2 and decrements by one the count corresponding to the hard disk number of the hard disk which issued the response command (SP160).

The HDD_CNT unit 14215 references the threshold value management table T3 and determines whether there are counts which break above (or still exceed) the threshold value among the counts managed in the HDD_CNT table T2 (SP161).

Upon obtaining an affirmative result in the determination of step SP161, the HDD_CNT unit 14215 newly creates a bitmap table T4 and transmits the created bitmap table T4 to the local memory 132 in the microprocessor package 13 (SP162). If, on the other hand, a negative result is obtained in the determination of step SP161, the HDD_CNT unit 14215 moves to step SP163.

The controller 14211 reads and converts the read command stored in the real RSP_Q in the internal memory 14212 in step SP159, and transmits the converted read command to the VRSP_Q in the local memory 132 (SP163). The controller 14211 then updates the VRSP_PI in the local memory 132 (SP164) and ends the HDD_CNT processing.

(6) RX_ID

FIG. 11 shows the internal constitution of the RXID unit 11214. The RX_ID unit 11214 is configured from an RX_ID management table 112141 and an RX_ID retrieval circuit 112142.

The RX_ID management table 112141 is a table for centrally managing the usable RX_IDs (a total of 4096, for example) assigned to the microprocessors in the microprocessor 131. Details will be described subsequently (FIG. 12). The RX_ID retrieval circuit 112142 is a control circuit which, when an RX_ID is assigned to a command, retrieves currently used RX_IDs from among the usable RX_IDs managed in the RX_ID management table 112141. The RX_IDs which are retrieved by the RX_ID retrieval circuit 112142 then come to be assigned to commands.

FIG. 12 shows the logical constitution of the RX_ID management table 112141. The RX_ID management table 112141 is a management table for centrally managing, as RX_IDs which are available for shared usage by all the microprocessors, usable RX_IDs which conventionally would have been assigned uniformly to each microprocessor. In the RX_ID management table 112141, RX_ID numbers and used microprocessor numbers are managed in association with one another. Hence, in the case of FIG. 12, for example, in a case where the IORP 1121 transmits a command to the local memory 132 and the command is transmitted with an RX_ID with the RX_ID number "0x000" assigned to the command, a "used microprocessor number" (2, for example) is stored at the location corresponding to "0x000".

FIG. 13 shows a detailed processing routine for RX_ID assignment processing. The protocol chip 111 transmits the read command from the host 2 to the internal memory 11212 (SP171), the internal memory 11212 stores the read command in the real RSP_Q (SP172), the protocol chip 111 updates the RSP_PI (SP174), and when the controller 11211 detects the update to the RSP_PI (SP174), the RX_ID assignment processing is executed in the IORP 1121.

Upon detecting the update to the RSP_PI, the controller 11211 in the IORP 1121 issues a request to the RX_ID unit 11214 requesting retrieval of an assignable unused RX_ID. The RX_ID unit 11214 references the RX_ID management table 112141 and retrieves unused RX_IDs which are not currently being used, and outputs an unused RX_ID obtained as the retrieval result to the controller 11211. Upon acquiring an unused RX_ID output from the RX_ID unit 11214 (SP175), the controller 11211 writes an in-use flag in the RX_ID management table 112141 (SP176).

The controller 11211 subsequently assigns an unused RX_ID which was acquired in step SP175 to the read command storing the real RSP_Q (SP177), and transmits the RX_ID-assigned read command to the VRSP_Q in the local memory 132 (SP178).

After step SP178, a read command is transferred to the microprocessor package 13 and the disk adapter package 14 in that order, and is ultimately transmitted to the corresponding hard disk in the disk unit 15. The read data is then read from the hard disk and the read data thus read is then transferred to the disk adapter package 14, the microprocessor package 13, and the channel adapter package 11 in that order. At this time, the RX_ID acquired in step SP175 is used (SP179, SP180).

When the read data transfer is complete, a response command is transmitted from the disk unit 15 to the disk adapter package 14. The disk adapter package 14 transmits a response command to the VRSP_Q in the local memory 132. The microprocessor 131 transmits a response command stored in the VRSP_Q to the VREQ_Q in the external memory 113 (SP181), and updates the VREQ_PI in the internal memory 11212 (SP182).

Upon detecting the update to the VREQ_PI in the internal memory 11212 (SP183), the controller 11211 references the RX_ID management table 112141 and acquires the microprocessor number associated with the RX_ID for which the read data transfer is complete (SP184).

The controller 11211 transmits a data transfer completion notification, which reports the data transfer completion to the microprocessor with the MP number acquired in step SP184, to the microprocessor 131 (SP185). The microprocessor 131 which has received the data transfer completion notification clears the in-use flag which was written in the RX_ID management table 112141 in step SP176 (SP186).

The controller 11211 converts the response command stored in the external memory 113, transmits the converted response command to the real REQ_Q (SP187) and ends the RX_ID assignment processing.

(7) Advantageous Effects of Embodiment

As described hereinabove, the storage system 100 according to this embodiment is constituted comprising three characteristics, namely, the PI check, HDD_CNT processing and RX_ID assignment processing.

In the PI check, because the controller 11211 detects an update to the VREQ_PI in the internal memory 11212 by detecting an update to the IR 11211A, there is no need to perform separate polling of the VREQ_PI in a quantity corresponding to all the microprocessors, thereby enabling a reduction of the load of the controller 11211.

Furthermore, in the HDD_CNT processing, since a request is sent to the microprocessor 131 to not issue commands to a hard disk that currently has a high load, hard disk load distribution can be achieved.

Further, in RX_ID assignment processing, since usable RX_IDs which are shared by all the microprocessors are collectively managed and the RX_IDs are dynamically assigned where necessary, it is possible to prevent depletion of the RX_IDs even when processing is focused on a single microprocessor.

Accordingly, with this embodiment, it is possible to realize an improvement in processing speed of a storage apparatus which contains a plurality of microprocessors.

(8) Further Embodiments

Figure 14:
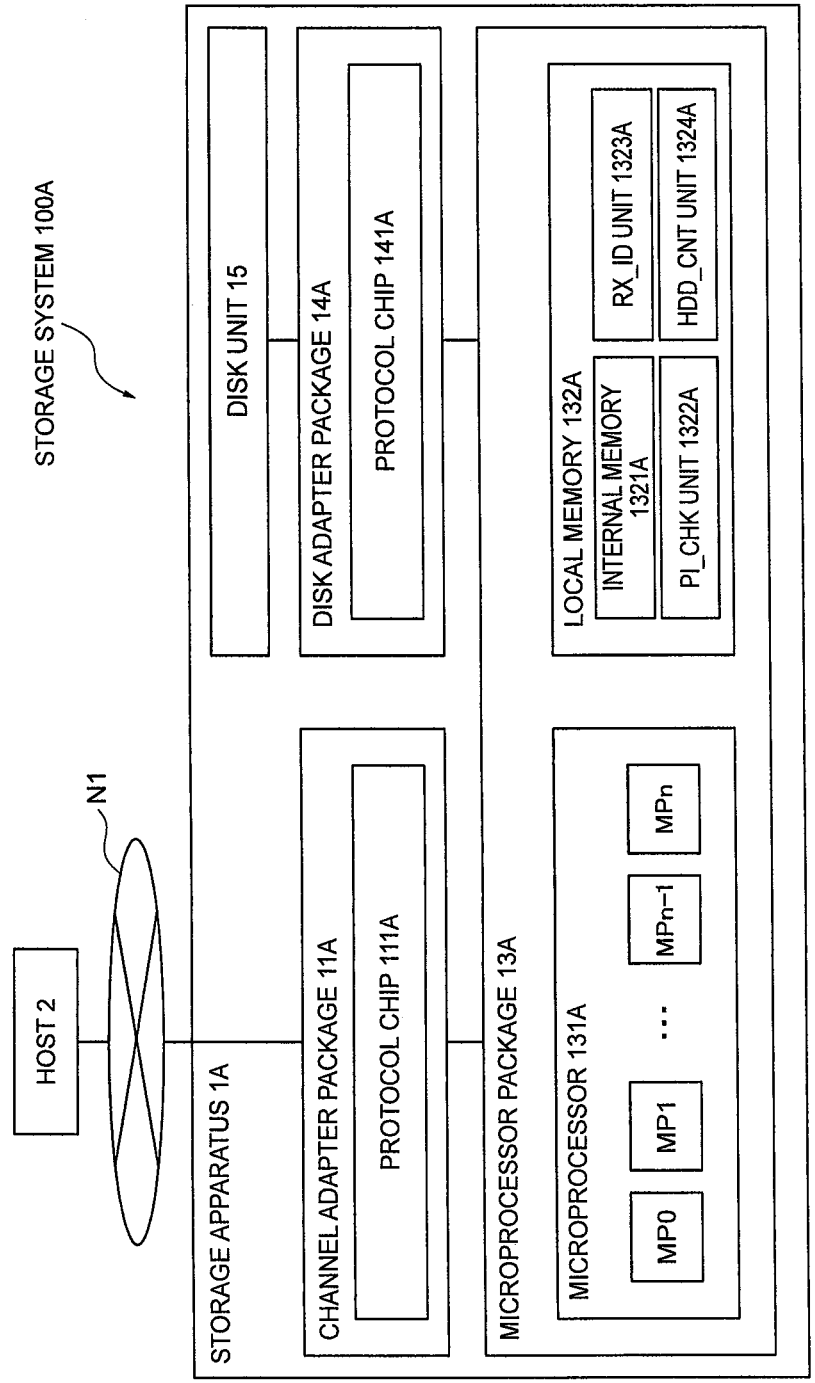
FIG. 14 is an overall constitutional view of a storage system according to a second embodiment.

FIG. 14 is an overall constitutional view of a storage system 100A according to another embodiment. The storage system 100A according to the other embodiment differs from the storage system 100 according to the present embodiment in that the storage system 100A does not comprise an I/O router and an external memory (the IORP in particular) inside a channel adapter package 11A and a disk adapter package 14A, and stores a storage area and programs (an internal memory 1321A, a PI_CHK unit 1322A, an RX_ID unit 1323A, and an HDD_CNT unit 1324A) for exhibiting the IORP function in a local memory 132A of the microprocessor package 13A. Thus, the advantageous effects of the present embodiment can be attained even by fulfilling the IORP function by means of software rather than hardware.

REFERENCE SIGNS LIST

1 Storage apparatus
111 Protocol chip
112 I/O router
1121 IORP
11211 Controller
11212 Internal memory
11213 PI_CHK unit
11214 RX_ID unit
113 External memory
13 Microprocessor package
131 Microprocessor (MP)
132 Local memory
141 Protocol chip
142 I/O router
1421 IORP
14211 Controller
14215 HDD_CNT unit
143 External memory

The invention claimed is:

1. A storage apparatus which contains a plurality of microprocessors, comprising:
   a virtual queue which stores a virtual command which is used in the storage apparatus;
   a real queue which stores a real command based on a communication protocol;
   a first pointer which is updated when the virtual command is stored in the virtual queue;
   a second pointer which is updated when the first pointer is updated;
   a checking unit which detects an update to the first pointer and updates the second pointer; and
   a controller,
   wherein, upon detecting that the second pointer has been updated by the checking unit, the controller references the second pointer and reads the first pointer, references the first pointer and reads the virtual command stored in the virtual queue, and after converting the virtual command to the real command, stores the real command in the real queue.

2. The storage apparatus according to claim 1, further comprising:
   an external memory in which the virtual queue and the real queue are provided;

an internal memory in which the first pointer is provided; and a register in which the second pointer is provided, wherein the register is provided in the controller.

3. The storage apparatus according to claim 2, wherein the checking unit continuously monitors access to the internal memory, and when access to update the first pointer has been made to the internal memory, sets a write flag in the register, and when there is a plurality of set write flags, performs arbitration and sets an arbitration result, updates the second pointer in the register on the basis of the write flag and the arbitration result, and meanwhile, when access to read the first pointer has been made to the internal memory by the controller, updates the second pointer by resetting the register.

4. The storage apparatus according to claim 1, further comprising:

a counting unit which monitors a load of each of a plurality of hard disks, wherein the counting unit manages the number of commands processed by the hard disks, and when the number of commands has exceeded a predefined threshold value or the number of commands is no more than the threshold value, the counting unit creates a bitmap indicating that the number of commands has exceeded the threshold value or a bitmap indicating that the number of commands is no more than the threshold value, and wherein the controller transmits the bitmap created by the counting unit to the microprocessor.

5. The storage apparatus according to claim 4, wherein the counting unit manages the number of commands processed by the hard disk by incrementing the count of the number of commands managed for the hard disk when the virtual command is stored in the virtual queue, but by decrementing the count of the number of commands managed for the hard disk when the real command from the hard disk is stored in the real queue.

6. The storage apparatus according to claim 1, further comprising:

an ID unit which manages IDs used at the time the virtual command is transferred, wherein the ID unit collectively manages the IDs as IDs which are used by being shared by the plurality of microprocessors, and when the virtual command is transmitted to the microprocessor, retrieves an unused ID which is not currently being used among the collectively managed IDs, and wherein the controller assigns the unused ID retrieved by the ID unit to the virtual command and transmits the virtual command to the microprocessor.

7. The storage apparatus according to claim 6, wherein, when the real command from a host system is stored in the real queue, the ID unit retrieves an unused ID which is not currently being used among the collectively managed IDs and outputs a retrieval result to the controller, and manages the unused ID as a currently used ID, but when the virtual command from the microprocessor is stored in the virtual queue, the ID unit manages the ID assigned to the virtual command as the unused ID.

8. A command control method of a storage apparatus which contains a plurality of microprocessors, comprising:

a first step in which the microprocessor stores a virtual command, which is only used in the storage apparatus, in a virtual queue;

a second step in which the microprocessor updates a first pointer when the virtual command is stored in the virtual queue;

a third step in which a checking unit detects an update to the first pointer and updates the second pointer; and a fourth step in which, upon detecting that the second pointer has been updated by the checking unit, a controller references the second pointer and reads the first pointer, references the first pointer and reads the virtual command stored in the virtual queue, and after converting the virtual command to a real command based on an actual communication protocol, stores the real command in the real queue.

9. The command control method according to claim 8, further comprising:

an external memory in which the virtual queue and the real queue are provided;

an internal memory in which the first pointer is provided; and a register in which the second pointer is provided, wherein the register is provided in the controller.

10. The command control method according to claim 9, wherein, in the third step, the checking unit continuously monitors access to the internal memory, and when access to update the first pointer has been made to the internal memory, sets a write flag in the register, and when there is a plurality of set write flags, performs arbitration and sets an arbitration result, updates the second pointer in the register on the basis of the write flag and the arbitration result, and meanwhile, when access to read the first pointer has been made to the internal memory by the controller, updates the second pointer by resetting the register.

11. The command control method according to claim 8, further comprising:

a fifth step in which a counting unit manages the number of commands processed by each of a plurality of hard disks, and when the number of commands has exceeded a predefined threshold value or the number of commands is no more than the threshold value, the counting unit creates a bitmap indicating that the number of commands has exceeded the threshold value or a bitmap indicating that the number of commands is no more than the threshold value; and a sixth step in which the controller transmits the bitmap created by the counting unit to the microprocessor.

12. The command control method according to claim 11, wherein, in the fifth step, the counting unit manages the number of commands processed by the hard disk by incrementing the count of the number of commands managed for the hard disk when the virtual command is stored in the virtual queue, but by decrementing the count of the number of commands managed for the hard disk when the real command from the hard disk is stored in the real queue.

13. The command control method according to claim 8, further comprising:

a seventh step in which an ID unit collectively manages IDs used at the time the virtual command is transferred as IDs which are used by being shared by the plurality of microprocessors, and when the virtual command is transmitted to the microprocessor, retrieves an unused ID which is not currently being used among the collectively managed IDs; and an eighth step in which the controller assigns the unused ID retrieved by the ID unit to the virtual command and transmits the virtual command to the microprocessor.

14. The command control method according to claim 13, wherein, in the seventh step,
if the real command from a host system is stored in the real queue, the ID unit retrieves an unused ID which is not currently being used among the collectively managed IDs and outputs a retrieval result to the controller, and manages the unused ID as a currently used ID, but when the virtual command from the microprocessor is stored in the virtual queue, the ID unit manages the ID assigned to the virtual command as the unused ID.

15. A storage apparatus which contains a plurality of microprocessors, comprising:
a microprocessor package which comprises the plurality of microprocessors; and
a channel adapter package and a disk adapter package which are connected to the microprocessor package,
wherein the microprocessor package comprises:
a virtual queue which stores a virtual command which is used in the storage apparatus;
a real queue which stores a real command based on a communication protocol;
a first pointer which is updated when the virtual command is stored in the virtual queue;
a second pointer which is updated when the first pointer is updated;
a checking unit which detects an update to the first pointer and updates the second pointer;
a counting unit which monitors a load of each of a plurality of hard disks connected to the disk adapter package and manages the number of counts processed by the hard disks, and when the number of commands has exceeded a predefined threshold value or the number of commands is no more than the threshold value, the counting unit creates a bitmap indicating that the number of commands has exceeded the threshold value or a bitmap indicating that the number of commands is no more than the threshold value;
an ID unit which collectively manages IDs used at the time the virtual command is transferred as IDs which are used by being shared by the plurality of microprocessors, and when the virtual command is transmitted to the microprocessor, retrieves an unused ID which is not currently being used among the collectively managed IDs; and
a controller,
wherein, upon detecting that the second pointer has been updated by the checking unit, the controller references the second pointer and reads the first pointer, references the first pointer and reads the virtual command stored in the virtual queue, and after converting the virtual command to the real command, stores the real command in the real queue,
wherein the controller transmits the bitmap created by the counting unit to the microprocessor, and
wherein the controller assigns the unused ID retrieved by the ID unit to the virtual command and transmits the virtual command to the microprocessor.

* * * * *